US010791339B2

United States Patent
He

(10) Patent No.: US 10,791,339 B2
(45) Date of Patent: *Sep. 29, 2020

(54) CODING OF LAST SIGNIFICANT COEFFICIENT FLAGS

(71) Applicant: GOOGLE LLC, Mountain View, CA (US)

(72) Inventor: Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,933

(22) Filed: Nov. 12, 2019

(65) Prior Publication Data

US 2020/0084474 A1 Mar. 12, 2020

Related U.S. Application Data

(63) Continuation of application No. 15/707,300, filed on Sep. 18, 2017, now Pat. No. 10,523,968.

(51) Int. Cl.
| | | |
|---|---|---|
| H04N 19/61 | (2014.01) | |
| H04N 19/174 | (2014.01) | |
| H04N 19/64 | (2014.01) | |
| H04N 19/91 | (2014.01) | |
| H04N 19/70 | (2014.01) | |
| H04N 19/18 | (2014.01) | |

(52) U.S. Cl.
CPC .......... *H04N 19/61* (2014.11); *H04N 19/174* (2014.11); *H04N 19/18* (2014.11); *H04N 19/64* (2014.11); *H04N 19/70* (2014.11); *H04N 19/91* (2014.11)

(58) Field of Classification Search
None
See application file for complete search history.

(56) References Cited

U.S. PATENT DOCUMENTS 7,702,013 B2 4/2010 Schwarz et al.
8,964,849 B2 2/2015 Nguyen et al.
8,976,861 B2 * 3/2015 Rojals .................... H04N 19/14
375/240.02

(Continued)

OTHER PUBLICATIONS

Nguyen et al., "Multi-level significance maps for Large Transform Units", Joint Collaborative Team on Video Coding (JCT-VC) of ITU-T SG16 WP3 and ISO/IEC JTC1/SC29/WG11, 7th Meeting: Geneva, Nov. 21-30, 2011, Docuement: JCTVC-G644, 14 pages. (Year: 2011).*

(Continued)

*Primary Examiner* — William C Vaughn, Jr.
*Assistant Examiner* — Joseph Daniel A Towe
(74) *Attorney, Agent, or Firm* — Young Basile Hanlon & MacFarlane, P.C.

(57) ABSTRACT

An apparatus for coding a transform block of coefficients that is decoded using a scan order includes a memory and a processor. The processor is configured to execute instructions stored in the memory to determine a first index indicating a group of consecutive scan positions in the scan order, where the group of consecutive scan positions includes a scan position of a last non-zero coefficient; determine a second index indicating an offset within the group of consecutive scan positions of the last non-zero coefficient; and code a subset of the coefficients until the second index is determined.

20 Claims, 17 Drawing Sheets

(56) References Cited

U.S. PATENT DOCUMENTS

| | | | |
|---|---|---|---|
| 2012/0140814 A1 | 6/2012 | Sole Rojals et al. | |
| 2013/0034153 A1* | 2/2013 | Song | H04N 19/159 375/240.03 |
| 2013/0188688 A1* | 7/2013 | Panusopone | H04N 19/198 375/240.02 |
| 2013/0272379 A1 | 10/2013 | Sole Rojals et al. | |
| 2019/0306536 A1* | 10/2019 | Lim | H04N 19/649 |

OTHER PUBLICATIONS

Nguyen et al., "Multi-level significance maps for Large Transform Units", Joint Collaborative Team on Video Coding (JCT-VC) of ITU-T SG16 WP3 and ISO/IEC JTC1/SC29/WG11, 7th Meeting: Geneva, Nov. 21-30, 2011, Document: JCTVC-G644, 14 pages. (Year: 2011).*

Bankoski, et al., "Technical Overview of VP8, an Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/031576, dated Jul. 9, 2018, 16 pgs.

Nguyen Nguyen et al., "Multi-level significance maps for Large Transform Units", Joint Collaborative Team on Video Coding (JCT-VC) of ITU-T SG 16 WP 3 and ISO/IEC JTC1/SC29/WG11, 7th Meeting, Geneva, Switzerland, Nov. 21-30, 2011 (url: http://phenix.int-evry.fr/jct/, document No. JCTVC-G644-v5 (Nov. 26, 2017), 11 pgs.

Joel Sole et al., "Transform Coefficient Coding in HEVC", IEEE Transactions on Circuits and Systems for Video Technology, vol. 22, No. 12, Dec. 2012, pp. 1765-1777.

Nguyen et al., "Multi-level significance maps for Large Transform Units", JCTVC-G644-r3 of Joint Collaborative Team on Video Coding (JCT-VC) of ITU-T SG16 WP3 and ISO/IEC JTC1/SC29/WG11. 7th Meeting: Geneva, Nov. 21-30, 2011. (Year: 2011).

* cited by examiner

1000

1008  COL  1010                    1002
ROW    0   1   2   3   4   5   6   7
  0    0   2   3   9  10  20  21  35
  1    1   4   8  11  19  22  34  36
1004 → 2   5   7  12  18  23  33  37  48 ← 1006
  3    6  13  17  24  32  38  47  49
  4   14  16  25  31  39  46  50  57
  5   15  26  30  40  45  51  56  58
  6   27  29  41  44  52  55  59  62
  7   28  42  43  53  54  60  61  63

1050

1058  1060  COL                     1052
ROW    0   1   2   3   4   5   6   7
  0    8   3   0   0   0   0  -1   0
  1    2   0   0   0   0   2   1   0
1054 → 2   0   0   1   0   1   1   1   0 ← 1056
  3    1   0   0   0   0   0   0   0
  4    0   0   0   0   0   0   0   0
  5    0   0   0   0   0   0   0   0
  6    0   0   0   0   0   0   0   0
  7    0   0   0   0   0   0   0   0

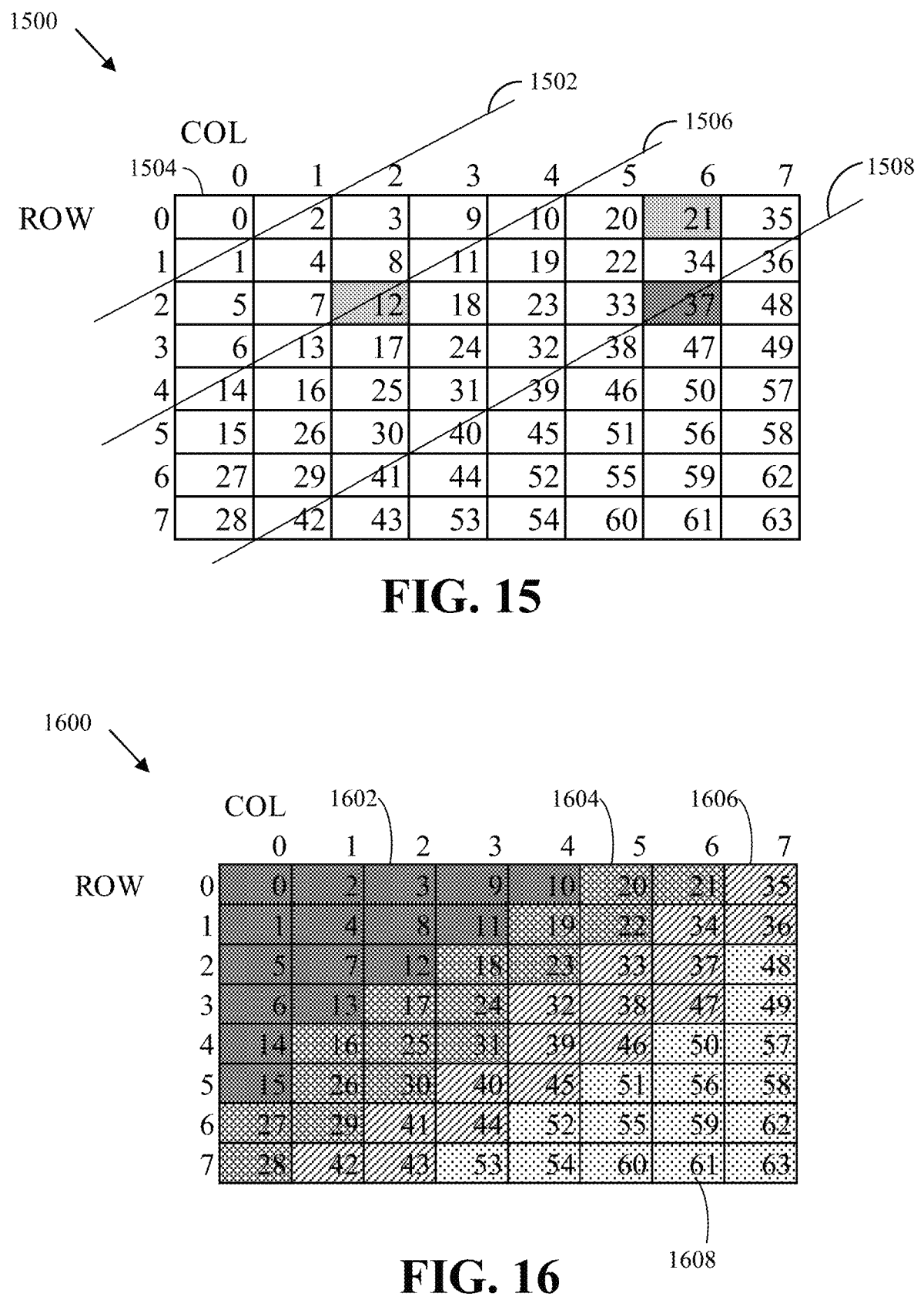

| COL | 0 | 1 | 2 | 3 | 4 | 5 | 6 | 7 |
|---|---|---|---|---|---|---|---|---|
| ROW 0 | 0 | 2 | 3 | 9 | 10 | 20 | 21 | 35 |
| 1 | 1 | 4 | 8 | 11 | 19 | 22 | 34 | 36 |
| 2 | 5 | 7 | 12 | 18 | 23 | 33 | 37 | 48 |
| 3 | 6 | 13 | 17 | 24 | 32 | 38 | 47 | 49 |
| 4 | 14 | 16 | 25 | 31 | 39 | 46 | 50 | 57 |
| 5 | 15 | 26 | 30 | 40 | 45 | 51 | 56 | 58 |
| 6 | 27 | 29 | 41 | 44 | 52 | 55 | 59 | 62 |
| 7 | 28 | 42 | 43 | 53 | 54 | 60 | 61 | 63 |

FIG. 16

| COL | 0 | 1 | 2 | 3 | 4 | 5 | 6 | 7 |
|---|---|---|---|---|---|---|---|---|
| ROW 0 | 0 | 2 | 3 | 9 | 10 | 20 | 21 | 35 |
| 1 | 1 | 4 | 8 | 11 | 19 | 22 | 34 | 36 |
| 2 | 5 | 7 | 12 | 18 | 23 | 33 | 37 | 48 |
| 3 | 6 | 13 | 17 | 24 | 32 | 38 | 47 | 49 |
| 4 | 14 | 16 | 25 | 31 | 39 | 46 | 50 | 57 |
| 5 | 15 | 26 | 30 | 40 | 45 | 51 | 56 | 58 |
| 6 | 27 | 29 | 41 | 44 | 52 | 55 | 59 | 62 |
| 7 | 28 | 42 | 43 | 53 | 54 | 60 | 61 | 63 |

CODING OF LAST SIGNIFICANT COEFFICIENT FLAGS

CROSS-REFERENCE TO RELATED APPLICATION(S)

This application is a continuation of U.S. application patent Ser. No. 15/707,300, filed Sep. 18, 2017, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

A first aspect is an apparatus for decoding a transform block of coefficients that is decoded using a scan order. The apparatus includes a memory and a processor. The processor is configured to execute instructions stored in the memory to partition all scan positions of the scan order into K>1 non-overlapping groups, such that each of the non-overlapping groups consists of consecutive scan positions of the scan order, and the non-overlapping groups constitute a coefficient groups coordinate system having a first dimension and a second dimension, where a first value of the first dimension corresponds to a group of the non-overlapping groups and a second value of the second dimension corresponds to an offset position within the group of the non-overlapping groups; determine, from an encoded bitstream, a group value corresponding to the first value of the first dimension, where the group value indicating one of the non-overlapping groups, and where the one of the non-overlapping groups includes a last non-zero coefficient of the transform block; determine, from the encoded bitstream, an offset position corresponding to the second value of the second dimension, the offset position indicating a position within the one of the non-overlapping groups of the last non-zero coefficient; and decode, from the encoded bitstream, coefficients using the one of the non-overlapping groups and the offset position.

A second aspect is a method for decoding a location of a last non-zero coefficient of a transform block of coefficients that is decoded using a scan order. The method includes partitioning all scan positions of the scan order into non-overlapping groups, each of the non-overlapping groups consisting of consecutive scan positions of the scan order; determining, from an encoded bitstream, a group of the non-overlapping groups, where the group includes the last non-zero coefficient of the transform block; determining, from the encoded bitstream, an offset position, where the offset position indicating a position within the group of the last non-zero coefficient; and decoding, from the encoded bitstream, the coefficients using the one of the non-overlapping groups and the offset position.

A third aspect is an apparatus for coding a transform block of coefficients that is decoded using a scan order. The apparatus includes a memory and a processor. The processor is configured to execute instructions stored in the memory to determine a first index indicating a group of consecutive scan positions in the scan order, where the group of consecutive scan positions includes a scan position of a last non-zero coefficient; determine a second index indicating an offset within the group of consecutive scan positions of the last non-zero coefficient; and code a subset of the coefficients until the second index is determined.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings wherein like reference numerals refer to like parts throughout the several views.

FIG. 10 is an example of a scan order and a block according to implementations of this disclosure.

FIG. 15 is an example of a polar coordinate system according to implementations of this disclosure.

FIG. 16 is an example of a coefficient groups coordinate system according to implementations of this disclosure.

DETAILED DESCRIPTION

Figure 1:
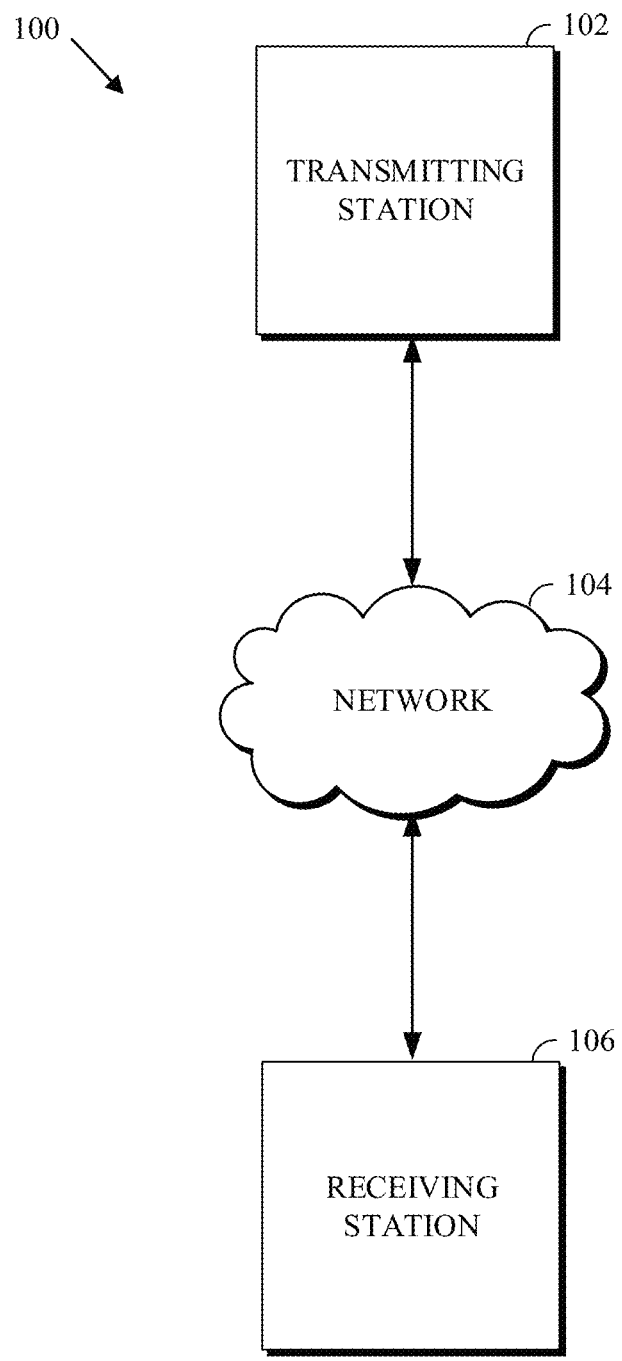
FIG. 1 is a schematic of a video encoding and decoding system.

As mentioned above, compression schemes related to coding video streams may include breaking images into blocks and generating a digital video output bitstream using one or more techniques to limit the information included in the output. A received encoded bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

As further described below, the residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients). Encoders may use techniques to decrease the amount of bits spent on coefficient coding. For example, a coefficient token tree (which may also be referred to as a binary token tree) specifies the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream in order to decode the video bitstream.

A quantized transform block can include zero and non-zero quantized transform coefficients. Non-zero coefficients are also referred to herein as significant coefficients. Encoding and decoding the quantized transform block can includes encoding and decoding the transform coefficients of the transform block according to a scan order. Encoding and decoding the quantized transform block can include encoding and decoding information regarding the significant coefficient that is the last non-zero quantized transform coefficient (i.e., last significant coefficient) in the transform block. This is referred to as coding of end-of-block (EOB) positions. Which transform coefficient is designated as the last non-zero transform coefficient is determined based on the scan order.

In some coding systems, the Cartesian coordinates (i.e., the column and row in the quantized transform block) of the last non-zero coefficient is coded. This is referred to herein as the Cartesian coordinates approach to the coding of the EOB positions.

In other coding systems, as each quantized transform coefficient is visited (i.e., to be coded or decoded) pursuant to a scan order, information is coded regarding whether the transform coefficient is the last non-zero coefficient. As such, the EOB positions are coded in an interleaving manner together with significant coefficient positions. This is referred to herein as the interleaving approach to the coding of the EOB positions.

As further illustrated below, the Cartesian coordinates approach can be more efficient when the transform block is dense. A dense transform block is such that the number of non-zero coefficients (i.e., significant coefficients) is relatively large. On the other hand, the interleaving approach can be more efficient when the transform block is sparse. A sparse coefficient block is one where the number of non-zero coefficients is relatively small.

Implementations according to this disclosure can combine the benefits of the Cartesian coordinates approach and the interleaving approach to code the EOB positions thereby reducing the number of bits required to represent video data. Coding of the EOB positions according to the teachings herein can perform well (e.g., in term of bits required to code the EOB position) for both dense and sparse transform blocks.

Implementations according to this disclosure map the transform coefficients of a transform block to a coordinate system having dimensions. Some of the values of a dimension include significant (i.e., non-zero) transform coefficients. For example, in a Cartesian coordinate system (described below), a dimension can be the column dimension. Referring to block 1050 (which is a transform block) of FIG. 10, the dimension value 6 (i.e., column index 6) includes significant coefficients, namely coefficient 1052 and coefficient 1056; whereas, the dimension value three (3) (i.e., column index 3) does not include non-zero coefficients. By coding only once, for a dimension value that includes significant coefficients whether the dimension value includes or does not include the last non-zero coefficient, the number of bits required to code the EOB positions can be reduced. Examples of coordinate systems include a Cartesian coordinate system, a polar coordinate system, a Cartesian grouping coordinate system, and a coefficient groups coordinate system. Other coordinate systems are also possible according to implementations of this disclosure. In the coordinate systems described herein, two dimensions are described for a coordinate system. However, a coordinate system can include more than two dimensions.

As mentioned above, the coordinate system can be a Cartesian coordinate system and the dimensions can be the columns and rows of the transform block. The coordinate system can be a polar coordinate system where the DC coefficient (i.e., the block location (0, 0) of the transform block) can be the center and the distance from the center can be measured using anti-diagonal lines. The anti-diagonal lines can be the first dimension and positions on the anti-diagonal lines can be the second dimension. The coordinate system can be a grouping system such that the transform coefficients are grouped into numbered groups, the first dimension can be the group index, and the second dimension can be the offset position of a transform coefficient within the group. Other coordinate systems are also possible.

Improved coding of last significant coefficient flags in video compression is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
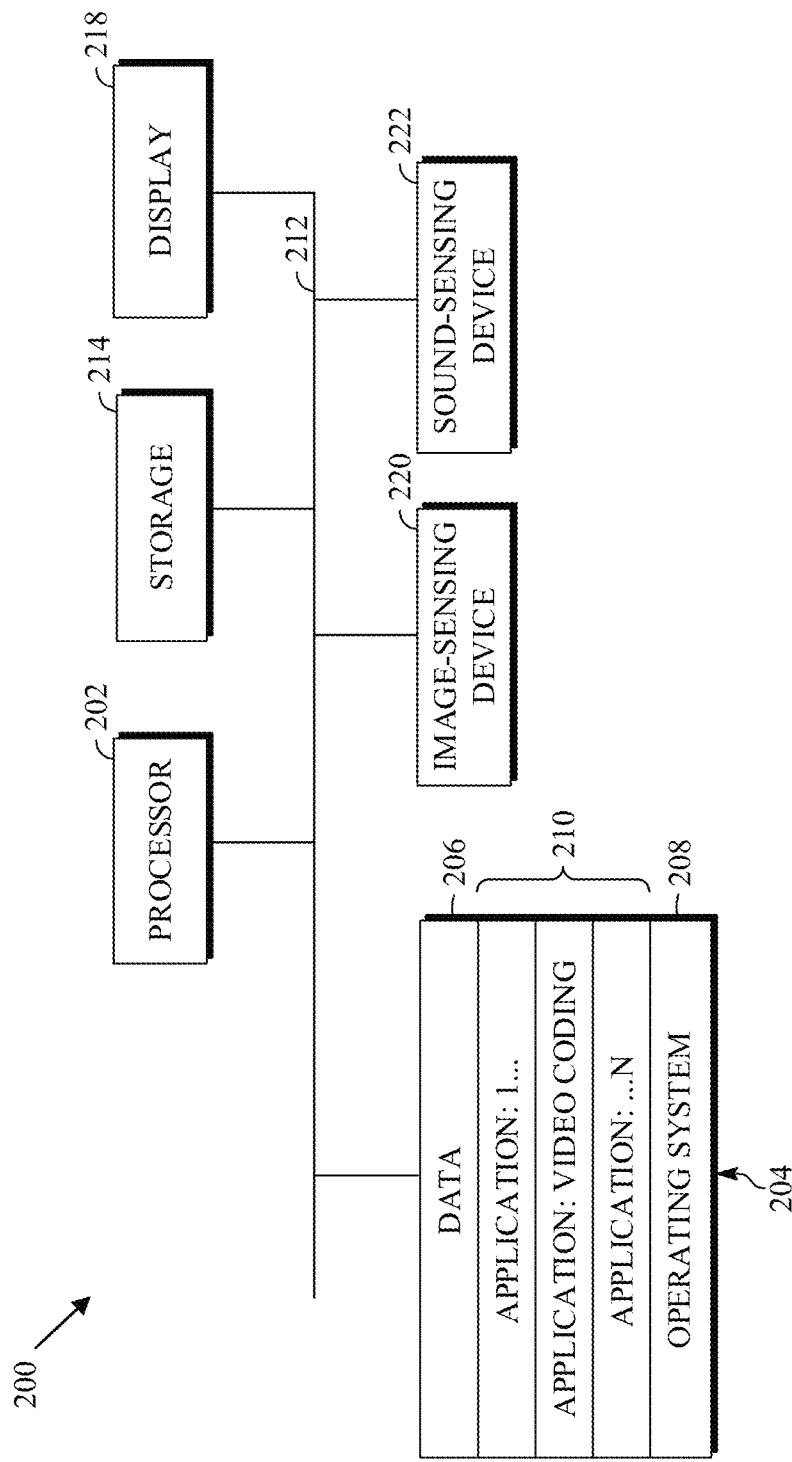
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission, at a later time, to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit.

Alternatively, the CPU 202 can be any other type of device, or multiple devices, capable of manipulating or processing information now existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
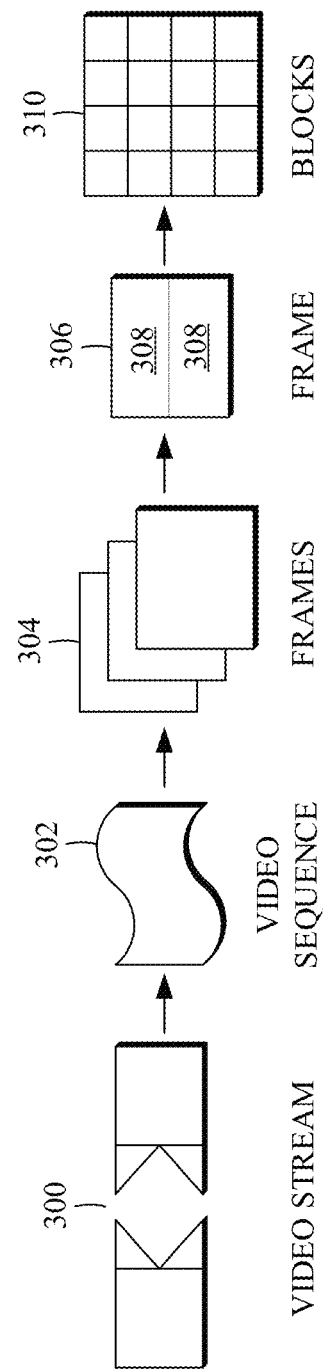
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
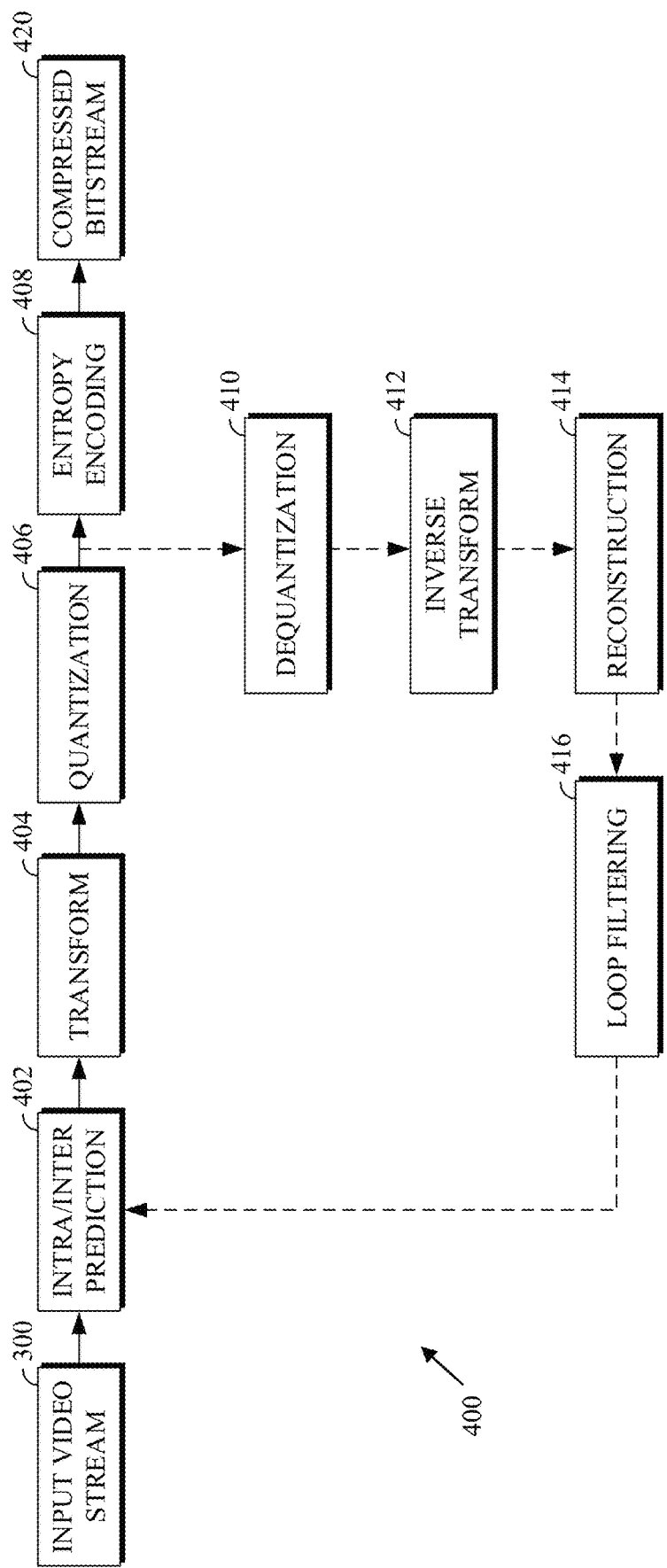
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
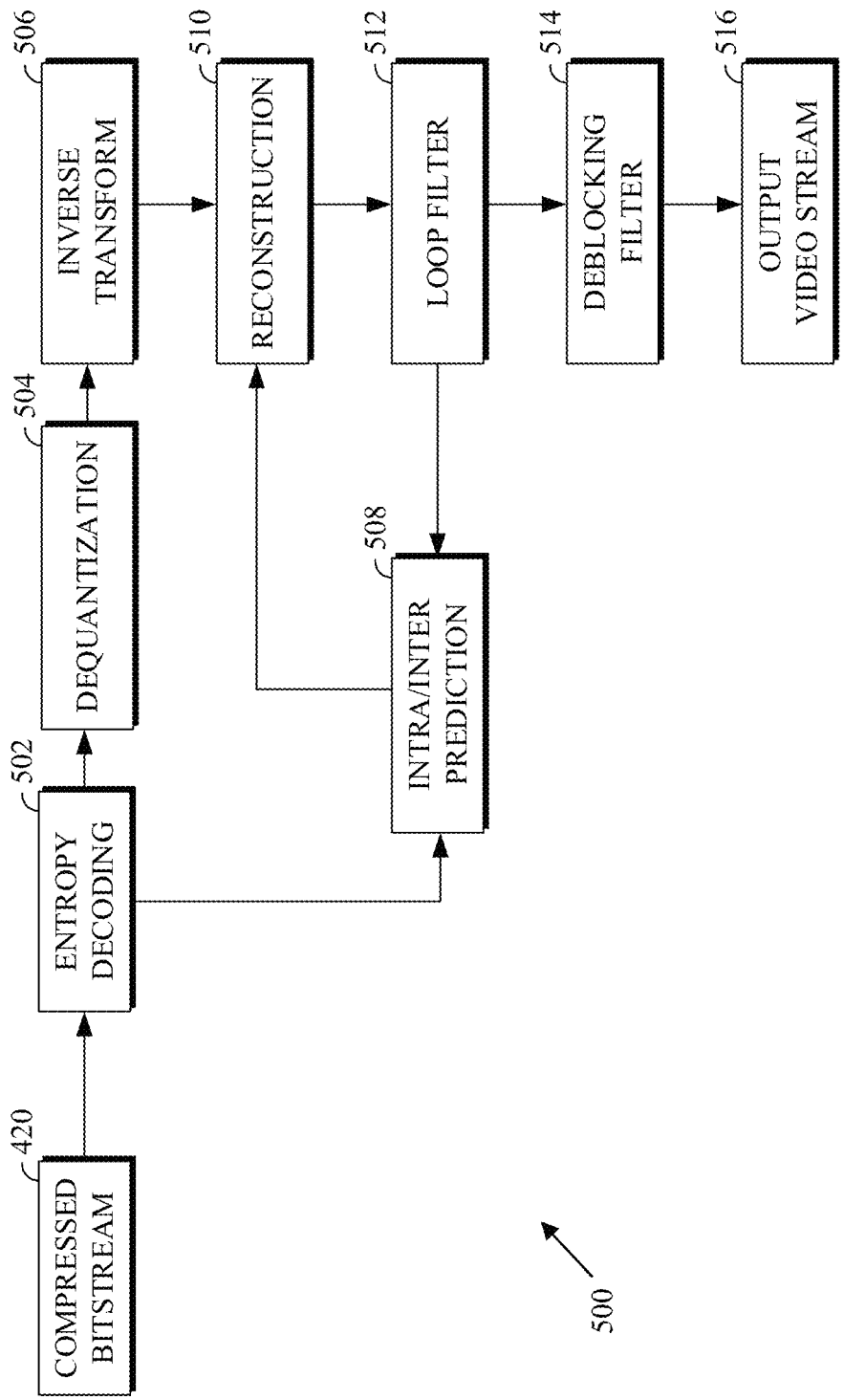
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 8 and 9 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
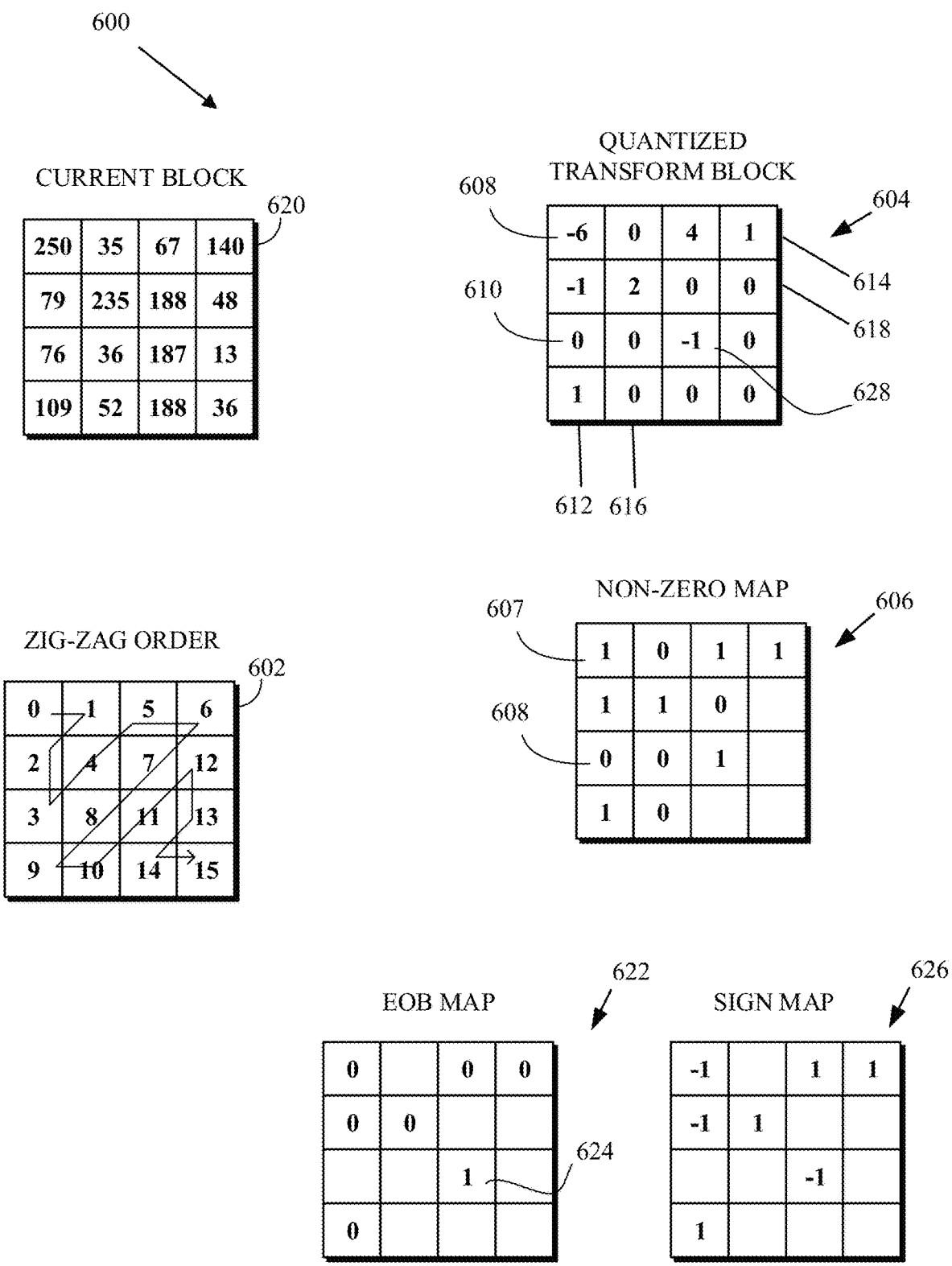
FIG. 6 is a diagram illustrating quantized transform coefficients according to implementations of this disclosure.

FIG. 6 is a diagram 600 illustrating quantized transform coefficients according to implementations of this disclosure. The diagram 600 depicts a current block 620, a scan order 602, a quantized transform block 604, a non-zero map 606, an end-of-block map 622, and a sign map 626. The current block 620 is illustrated as a 4×4 block. However, any block size is possible. For example, the current block can have a size (i.e., dimensions) of 4×4, 8×8, 16×16, 32×32, or any other square or rectangular block size. The current block 620 can be a block of a current frame. In another example, the current frame may be partitioned into segments (such as the segments 308 of FIG. 3), tiles, or the like, each including a collection of blocks, where the current block is a block of the partition.

The quantized transform block 604 can be a block of size similar to the size of the current block 620. The quantized transform block 604 includes non-zero coefficients (e.g., a coefficient 608) and zero coefficients (e.g., a coefficient 610). As described above, the quantized transform block 604 contains quantized transform coefficients for the residual block corresponding to the current block 620. Also as described above, the quantized transform coefficients are entropy coded by an entropy-coding phase, such as the entropy coding stage 408 of FIG. 4.

Entropy coding a quantized transform coefficient can involve the selection of a context model (also referred to as probability context model, probability model, model, and context) which provides estimates of conditional probabilities for coding the binary symbols of a binarized transform coefficient as, for example, described below with respect to FIG. 7. When entropy coding a quantized transform coefficient, additional information may be used as the context for selecting a context model. For example, the magnitudes of the previously coded transform coefficients can be used, at least partially, for determining a probability model.

To encode a transform block, a video coding system may traverse the transform block in a scan order and encode (e.g., entropy encode) the quantized transform coefficients as the quantized transform coefficients are respectively traversed (i.e., visited). In a zig-zag scan order, such as the scan order 602, the top left corner of the transform block (also known as the DC coefficient) is first traversed and encoded, the next coefficient in the scan order (i.e., the transform coefficient corresponding to the location labeled "1") is traversed and encoded, and so on. In the zig-zag scan order (i.e., scan order 602), some quantized transform coefficients above and to the left of a current quantized transform coefficient (e.g., a to-be-encoded transform coefficient) are traversed first. Other scan orders are possible. A one-dimensional structure (e.g., an array) of quantized transform coefficients can result from the traversal of the two-dimensional quantized transform block using the scan order.

In some examples, encoding the quantized transform block 604 can include determining the non-zero map 606, which indicates which quantized transform coefficients of the quantized transform block 604 are zero and which are non-zero. A non-zero coefficient and a zero coefficient can be indicated with values one (1) and zero (0), respectively, in the non-zero map. For example, the non-zero map 606 includes a non-zero 607 at Cartesian location (0, 0) corresponding to the coefficient 608 and a zero 608 at Cartesian location (2, 0) corresponding to the coefficient 610.

In some examples, encoding the quantized transform block 604 can include generating and encoding the end-ofblock map 622. The end-of-block map indicates whether a non-zero quantized transform coefficient of the quantized transform block 604 is the last non-zero coefficient with respect to a given scan order. If a non-zero coefficient is not the last non-zero coefficient in the transform block, then it can be indicated with the binary bit zero (0) in the end-of-block map. If, on the other hand, a non-zero coefficient is the last non-zero coefficient in the transform block, then it can be indicated with the binary value 1 (one) in the end-of-block map. For example, as the quantized transform coefficient corresponding to the scan position 11 (i.e., the last non-zero quantized transform coefficient 628) is the last non-zero coefficient of the quantized transform block 604, it is indicated with the end-of-block value 624 of 1 (one); all other non-zero transform coefficients are indicated with a zero.

In some examples, encoding the quantized transform block 604 can include generating and encoding the sign map 626. The sign map 626 indicates which non-zero quantized transform coefficients of the quantized transform block 604 have positive values and which quantized transform coefficients have negative values. Transform coefficients that are zero need not be indicated in the sign map. The sign map 626 illustrates the sign map for the quantized transform block 604. In the sign map, negative quantized transform coefficients can be indicated with a −1 and positive quantized transform coefficients can be indicated with a 1.

As mentioned above, the interleaving approach can be used by some coding systems to encode and/or decode the EOB position of the last non-zero quantized transform coefficient 628. An example of the interleaving approach is now given.

In the interleaving approach, a flag (e.g., a syntax element sig_coef_flag) can be used to indicate whether the coefficient being encoded or decoded is significant or not. For a transform coefficient, the syntax element sig_coef_flag answers the question: is the transform coefficient zero or non-zero. For example, if the syntax element sig_coef_flag is zero (0), then the current transform coefficient is zero; and if sig_coef_flag is one (1), then the current transform coefficient is non-zero.

In the interleaving approach, another flag indicates whether a coefficient being coded (i.e., encoded or decoded) is the last significant flag of the transform block, given a scan order, such as the scan order 602. The flag can be a syntax element called last_sig_flag. For a non-zero transform coefficient, the syntax element last_sig_flag answers the question: is the transform coefficient the last non-zero coefficient. A value of zero (0) can indicate that the transform coefficient is not the last non-zero coefficient and a value of one (1) can indicate that the transform coefficient is the last non-zero coefficient. A syntax element last_sig_flag can be encoded and decoded after every significant coefficient of the transform block.

As such, when a syntax element sig_coef_flag indicating that the current coefficient is non-zero (i.e., sig_coef_flag having a value of one (1)) is encoded or decoded, the corresponding syntax element last_sig_flag indicates whether the current non-zero coefficient is the last significant coefficient in the current block (e.g., last_sig_flag=1) or not (e.g., last_sig_flag=0). Accordingly, when the flag last_sig_flag that is set (e.g., last_sig_flag=1) is encoded or decoded, the EOB position of the current block is determined.

The interleaving approach for coding the EOB position in an N×N transform block can be summarized as follows:

At step 1, initialize a scan position i to zero (i.e., i=0). The scan position i corresponds to a scan order position. At step 2, encode/decode the syntax element sig_coef_flag at scan order position i. At step 3, determine whether the syntax element sig_coef_flag is set (e.g., sig_coef_flag=1), if so, then encode/decode the syntax element last_sig_flag at scan order position i. At step 4, increase i (i.e., i=i+1). The steps 2-4 are then repeated until the EOB position is encoded/decoded (i.e., last_sig_flag=1) or until the end of block is reached (i.e., when i has reached the value N*N). In step 3, the syntax element last_sig_flag at position i is not encoded/decoded if the end of block is reached (i.e., i=N*N−1). In such a case, the last coefficient of the transform block (i.e., the transform coefficient at the last scan order position) is assumed to be the EOB.

In a variation of the scheme above, the syntax element last_sig_flag may be replaced by an eob_flag that indicates that all the remaining coefficients, including the one at the current position in the current block, are zeroes. In that case, the syntax element eob_flag may be coded (encoded/decoded) immediately after a set sig_coef_flag. That is if a sig_coef_flag is set at position i, an eob flag is coded at position i+1.

Figure 7:
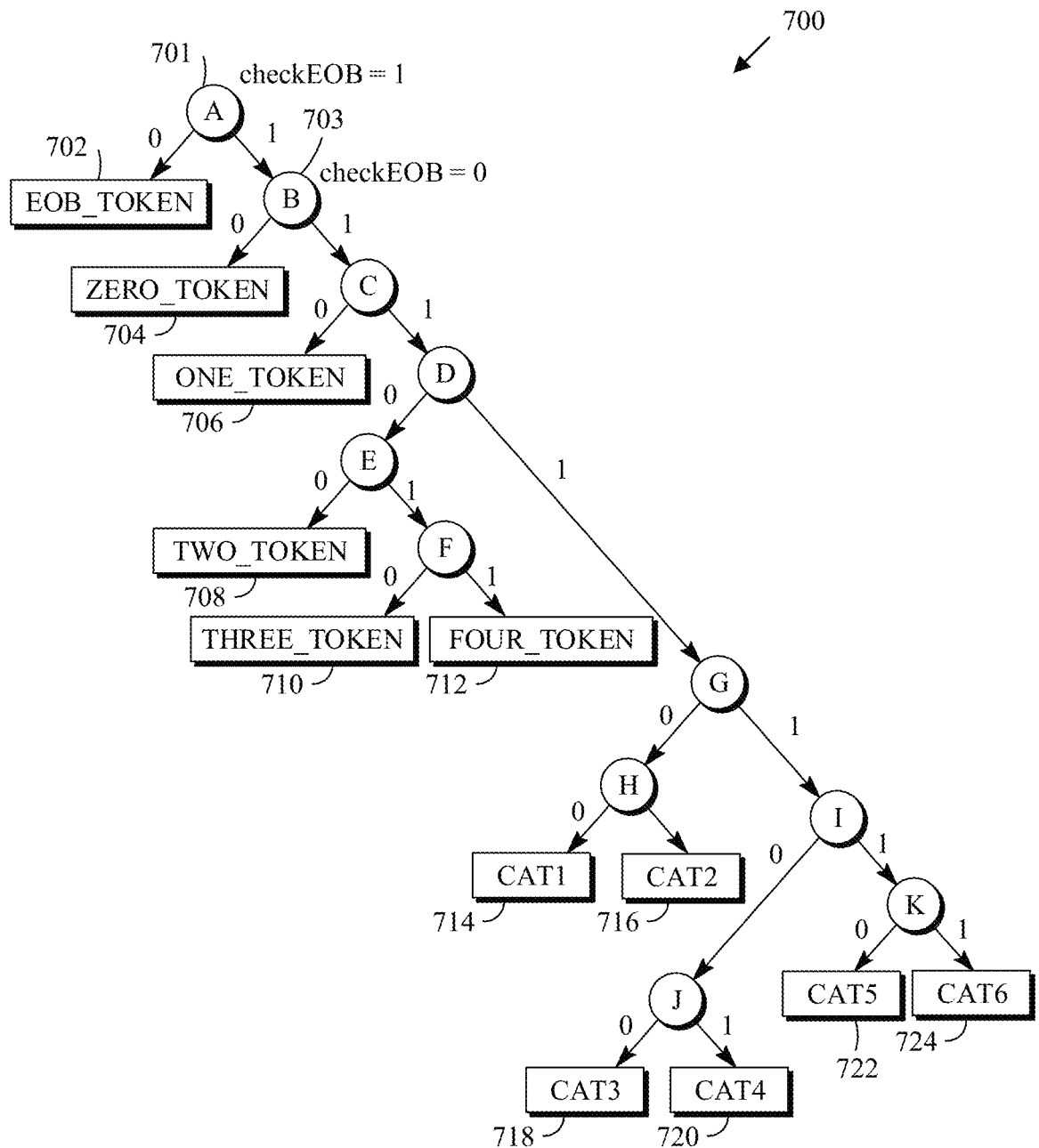
FIG. 7 is a diagram of a coefficient token tree that can be used to entropy code transform blocks according to implementations of this disclosure.

Another example of a coding system that uses the interleaving approach is now provided with respect to FIG. 7. In the example of FIG. 7 a coefficient binary tree is used.

FIG. 7 is a diagram of a coefficient token tree 700 that can be used to entropy code transform blocks according to implementations of this disclosure. The coefficient token tree 700 is referred to as a binary tree because, at each node of the tree, one of two branches must be taken (i.e., traversed). The coefficient token tree 700 includes a root node 701 and a node 703 corresponding, respectively, to the nodes labeled A and B.

As described above with respect to FIG. 6, when an end-of-block (EOB) token is detected for a block, coding of coefficients in the current block can terminate and the remaining coefficients in the block can be inferred to be zero. As such, the coding of EOB positions can be an essential part of coefficient in a video coding system.

Using the coefficient token tree 700, a string of binary digits is generated for a quantized coefficient (e.g., the coefficients 608, 610 of FIG. 6) of the quantized transform block (such as the quantized transform block 604 of FIG. 6).

In an example, the quantized coefficients in an N×N block (e.g., quantized transform block 604) are organized into a 1D (one-dimensional) array (herein, an array u) following a prescribed scan order (e.g., the scan order 602 of FIG. 6). N can be 4, 8, 16, 32, or any other value. The quantized coefficient at the $i^{th}$ position of the 1D array can be referred as u[i], where i=0, . . . , N*N−1. The starting position of the last run of zeroes in u[i], . . . , u[N*N−1] can be denoted as eob. In the case where the last location of the 1D array (i.e., u[N*N−1]) is not zero, the eob can be set to the value N*N. That is, if the last coefficient of the 1D array u is not zero, then eob can be set to be the last location of the 1D array (i.e., eob is set to the value N*N). Using the examples of FIG. 6, the 1D array u can have the entries u[ ]=[−6, 0, −1, 0, 2, 4, 1, 0, 0, 1, 0, −1, 0, 0, 0, 0]. The values at each of the u[i]s is a quantized transform coefficient. The quantized transform coefficients of the 1D array u may also be referred herein simply as "coefficients" or "transform coefficients." The coefficient at position i=0 (i.e., u[0]=−6) corresponds to the DC coefficient. In the example of FIG. 6, the eob is equal to 12 because there are no non-zero coefficients after the zero coefficient at position 12 of the 1D array u.

To encode and decode the coefficients u[i], ..., u[N*N−1], for i=0 to N*N−1, a token t[i] is generated at each position i<=eob. The token t[i], for i<eob, can be indicative of the size and/or size range of the corresponding quantized transform coefficient at u[i]. The token for the quantized transform coefficient at eob can be an EOB_TOKEN, which is a token that indicates that the 1D array u contains no non-zero coefficients following the eob position (inclusive). That is, t[eob]=EOB_TOKEN indicates the EOB position of the current block. Table I provides a listing of an example of token values, excluding the EOB_TOKEN, and their corresponding names according to an implementation of this disclosure.

TABLE I

| Token | Name of Token |
|---|---|
| 0 | ZERO_TOKEN |
| 1 | ONE_TOKEN |
| 2 | TWO_TOKEN |
| 3 | THREE_TOKEN |
| 4 | FOUR_TOKEN |
| 5 | DCT_VAL_CAT1 (5, 6) |
| 6 | DCT_VAL_CAT2 (7-10) |
| 7 | DCT_VAL_CAT3 (11-18) |
| 8 | DCT_VAL_CAT4 (19-34) |
| 9 | DCT_VAL_CAT5 (35-66) |
| 10 | DCT_VAL_CAT6 (67-2048) |

In an example, quantized coefficient values are taken to be signed 12-bit integers. To represent a quantized coefficient value, the range of 12-bit signed values can be divided into 11 tokens (the tokens 0-10 in Table I) plus the end of block token (EOB_TOKEN). To generate a token to represent a quantized coefficient value, the coefficient token tree 700 can be traversed. The result (i.e., the bit string) of traversing the tree can then be encoded into a bitstream (such as the bitstream 420 of FIG. 4) by an encoder as described with respect to the entropy encoding stage 408 of FIG. 4.

The coefficient token tree 700 includes the tokens EOB_TOKEN (token 702), ZERO_TOKEN (token 704), ONE_TOKEN (token 706), TWO_TOKEN (token 708), THREE_TOKEN (token 710), FOUR_TOKEN (token 712), CAT1 (token 714 that is DCT_VAL_CAT1 in Table I), CAT2 (token 716 that is DCT_VAL_CAT2 in Table I), CAT3 (token 718 that is DCT_VAL_CAT3 in Table I), CAT4 (token 720 that is DCT_VAL_CAT4 in Table I), CAT5 (token 722 that is DCT_VAL_CAT5 in Table I) and CAT6 (token 724 that is DCT_VAL_CAT6 in Table I). As can be seen, the coefficient token tree maps a single quantized coefficient value into a single token, such as one of the tokens 704, 706, 708, 710 and 712. Other tokens, such as the tokens 714, 716, 718, 720, 722 and 724, represent ranges of quantized coefficient values. For example, a quantized transform coefficient with a value of 37 can be represented by the token DCT_VAL_CAT5—the token 722 in FIG. 7.

The base value for a token is defined as the smallest number in its range. For example, the base value for the token 720 is 19. Entropy coding identifies a token for each quantized coefficient and, if the token represents a range, can form a residual by subtracting the base value from the quantized coefficient. For example, a quantized transform coefficient with a value of 20 can be represented by including the token 720 and a residual value of 1 (i.e., 20 minus 19) in the encoded video bitstream to permit a decoder to reconstruct the original quantized transform coefficient. The end of block token (i.e., the token 702) signals that no further non-zero quantized coefficients remain in the transformed block data.

To encode or decode a token t[i] by using a binary arithmetic coding engine (such as by the entropy encoding stage 408 of FIG. 4), the coefficient token tree 700 can be used. The coefficient token tree 700 is traversed starting at the root node 701 (i.e., the node labeled A). Traversing the coefficient token tree generates a bit string (a codeword) that will be encoded into the bitstream using, for example, binary arithmetic coding. The bit string is a representation of the current coefficient (i.e., the quantized transform coefficient being encoded).

If a current coefficient is zero, and there are no more non-zero values for the remaining transform coefficients, the token 702 (i.e., the EOB_TOKEN) is added into the bitstream. This is the case, for example, for the transform coefficient at scan order location 12 of FIG. 6. On the other hand, if the current coefficient is non-zero, or if there are non-zero values among any remaining coefficients of the current block, a "1" bit is added to the codeword and traversal passes to the node 703 (i.e., the node labeled B). At node B, the current coefficient is tested to see if it is equal to zero. If so, the left-hand branch is taken such that token 704 representing the value ZERO_TOKEN and a bit "0" is added to the codeword. If not, a bit "1" is added to the codeword and traversal passes to node C. At node C, the current coefficient is tested to see if it is greater than 1. If the current coefficient is equal to 1, the left-hand branch is taken and token 706 representing the value ONE_TOKEN is added to the bitstream (i.e., a "0" bit is added to the codeword). If the current coefficient is greater than 1, traversal passes to node D to check the value of the current coefficient as compared to the value 4. If the current coefficient is less than or equal to 4, traversal passes to node E and a "0" bit is added to the codeword. At node E, a test for equality to the value "2" may be made. If true, token 706 representing the value "2" is added to the bitstream (i.e., a bit "0" is added to the codeword). Otherwise, at node F, the current coefficient is tested against either the value "3" or the value "4" and either token 710 (i.e., bit "0" is added to the codeword) or token 712 (i.e., bit "1" is added to the codeword) to the bitstream as appropriate; and so on.

Essentially, a "0" bit is added to the codeword upon traversal to a left child node and a "1" bit is added to the codeword upon traversal to a right child node. A similar process is undertaken by a decoder when decoding a codeword from a compressed bitstream. The decoder reads a bit from bit stream. If the bit is a "1," the coefficient token tree is traversed to the right and if the bit is a "0," the tree is traversed to the left. The decoder reads then a next bit and repeats the process until traversal of the tree reaches a leaf node (i.e., a token). As an example, to encode a token t[i]=THREE_TOKEN, starting from the root node (i.e., the root node 701), a binary string of 111010 is encoded. As another example, decoding the codeword 11100 results in the token TWO_TOKEN.

Note that the correspondence between "0" and "1" bits to left and right child nodes is merely a convention used to describe the encoding and decoding processes. In some implementations, a different convention, for example, in one where "1" corresponds to the left child node, and "0" corresponds to the right child node, can be used. As long as both the encoder and the decoder adopt the same convention, the processes described herein apply.

Since an EOB_TOKEN is only possible after a non-zero coefficient, when u[i−1] is zero (that is, when the quantized transform coefficient at location i−1 of the 1D array u is equal to zero), a decoder can infer that the first bit must be 1. The first bit has to be 1 since, in traversing the tree, for a transform coefficient (e.g., transform coefficient at the zig-zag scan order location 2 of FIG. 6) following a zero transform coefficient (e.g., transform coefficient at the zig-zag scan order location 1 of FIG. 6), the traversal necessarily moves from the root node 701 to the node 703.

As such, a binary flag checkEob can be used to instruct the encoder and the decoder to skip encoding and decoding the first bit leading from the root node in the coefficient token tree 700. In effect, when the binary flag checkEob is 0 (i.e., indicating that the root node should not be checked), the root node 701 of the coefficient token tree 700 is skipped and the node 703 becomes the first node of coefficient token tree 700 to be visited for traversal. That is, when the root node 701 is skipped, the encoder can skip encoding and the decoder can skip decoding and can infer a first bit (i.e., a binary bit "1") of the encoded string.

At the start of encoding or decoding a block, the binary flag checkEob can be initialized to 1 (i.e., indicating that the root node should be checked). The following steps illustrate an example process for decoding quantized transform coefficients in an N×N block.

At step 1, the binary flag checkEob is set to zero (i.e., checkEob=0) and an index i is also set to zero (i.e., i=0).

At step 2, a token t[i] is decoded by using either
1) the full coefficient token tree (i.e., starting at the root node 701 of the coefficient token tree 700) if the binary flag checkEob is equal to 1 or
2) using the partial tree (e.g., starting at the node 703) where the EOB_TOKEN is skipped, if checkEob is equal to 0.

At step 3, If the token t[i]=EOB_TOKEN, then the quantized transform coefficients u[i], . . . , u[N*N−1] are all set to zero and the decoding process terminates; otherwise, extra bits can be decoded if necessary (i.e., when t[i] is not equal to the ZERO_TOKEN) and reconstruct u[i].

At step 4, the binary flag checkEob is set to 1 if u[i] is equal to zero, otherwise checkEob is set to 0. That is, checkEob can be set to the value (u[i] !=0).

At step 5, the index i is incremented (i.e., i=i+1).

At step 6, the steps 2-5 are repeated until all quantized transform coefficients have been decoded (i.e., until the index i=N*N) or until the EOB_TOKEN is decoded.

At step 2 above, decoding a token t[i] can include the steps of determining a context ctx, determining a binary probability distribution (i.e., a model) from the context ctx, and using a boolean arithmetic code to decode a path from the root node of the coefficient token tree 700 to a leaf node by using the determined probability distributions. The context ctx can be determined using a method of context derivation. The method of context derivation can use one or more of the block size, plane type (i.e., luminance or chrominance), the position i, and previously decoded tokens t[0], . . . , t[i−1] to determine the context ctx. Other criteria can be used to determine the context ctx. The binary probability distribution can be determined for any internal node of the coefficient token tree 700 starting from the root node 701 when checkEOB=1 or from the node 703 when checkEOB=0.

In some encoding systems, the probability used to encode or decode a token t[i] given a context ctx may be fixed and does not adapt in a picture (i.e., a frame). For example, the probability may be either a default value that is defined for the given context ctx or the probability may be coded (i.e., signaled) as part of the frame header for that frame. Coding the probability for every context in coding a frame can be costly. As such, an encoder may analyze, for each context, whether it is beneficial to code the context's associated probability in the frame header and signal its decision to the decoder by using a binary flag. Furthermore, coding the probability for a context may use prediction to reduce cost (e.g., in bit rate) where the prediction may be derived from the probability of the same context in a previously decoded frame. In some encoding systems, the probability given a context ctx can be adapted in a picture (i.e., frame) when a new symbol is decoded or encoded. Various adaptation methods can be used. Examples of adaptation methods include Laplace estimator, Krichevsky-Trofimov estimator, Good-Turing estimator, IIR (infinite impulse response) filter-based estimator, and finite-state machine-based estimator.

Figure 8:
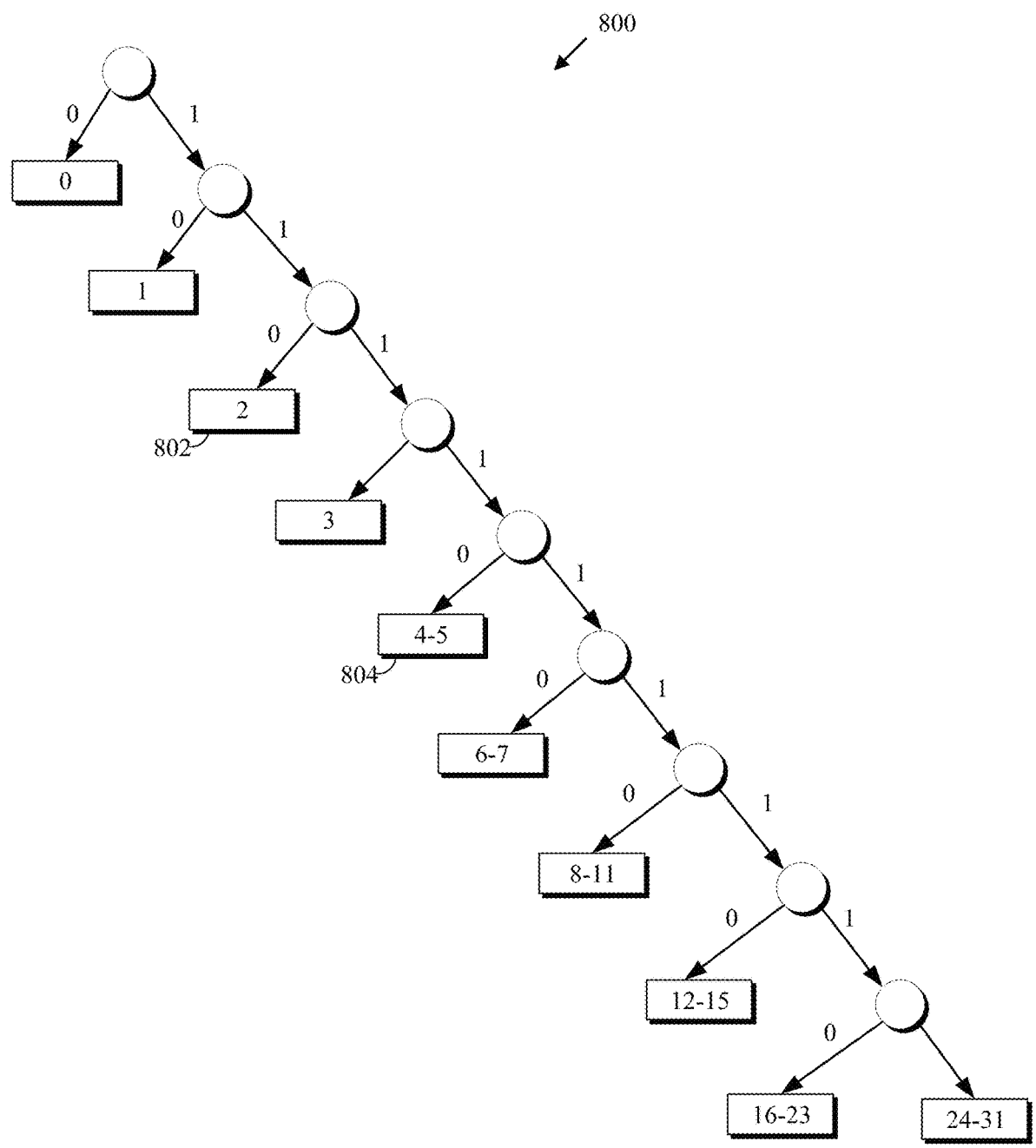
FIG. 8 is a diagram of an example of a tree for binarizing an EOB position according to implementations of this disclosure.

FIG. 8 is a diagram of an example of a tree 800 for binarizing an EOB position according to implementations of this disclosure. The tree 800 can be used by a coding system that implements the Cartesian coordinates approach of coding the EOB position. In the Cartesian coordinates approach, EOB positions can be coded as block positions. As such, and unlike the interleaving approaches described above, coding of the EOB positions is independent of scan orders. For a current block is of size N×N such that the last significant coefficient, according to a given scan order in the current block, is at block position (eob_x, eob_y), eob_x indicates the column number and eob_y indicates the row number. For example, and referring to FIG. 6, the last non-zero quantized transform coefficient 628 is at block position (2, 2). In the interleaving approach, once the EOB block position (eob_x, eob_y) is identified, coding of the column number eob_x and the row number eob_y is independent of any scan order that may be used for other aspects of the coding process.

The tree 800 can be used by a video coding system that uses the steps of binarization, context modelling, and binary arithmetic coding for encoding and decoding of quantized transform coefficients. The process may be referred to as context-adaptive binary arithmetic coding (CABAC). For example, to code a quantized transform coefficient x, the coding system may perform the following steps. The quantized transform coefficient x can be any of the coefficients (e.g., the coefficient 608) of the quantized transform block 604 of FIG. 6.

The following steps are similarly performed for both the column number eob_x and the row number eob_y. For simplicity, only the steps with respect to the column number eob_x are described.

In the binarization step, the column number eob_x of the EOB coefficient is first binarized into a binary string by using the tree 800. The binary tree 800 is traversed to generate a binary string prefix corresponding to the column number eob_x. For example, for a column number eob_x of three (3), the prefix generated by traversing the binary tree 800 is 1110 corresponding to node 802. As another example, if a column number eob_x is four (4) or five (5), then the prefix generated is 11110 corresponding to node 804. In the case of the node 804, a suffix is also generated to indicate whether the column number eob_x is four (i.e., a suffix of 0) or five (i.e., a suffix of 1). As such, if the column number eob_x is four, then the binary string 111100 is coded and if the column number eob_x is five, then the binary string 111101 is coded.

In the context derivation step, for each bin to be coded, a context is derived. A context can be derived from information such as one or more of the block size, plane type (i.e., luminance or chrominance), block position of the coefficient x, and previously decoded coefficients (e.g., a left and/or above neighboring coefficients, if available). Other, more, or less information can be used to derive the context.

In the binary arithmetic coding step, given a context, a bin is coded by using, e.g., a binary arithmetic coding engine into a binary codeword together with a probability value associated with the context.

As described above, the Cartesian coordinates approach and the interleaving approach use different approaches for coding the EOB position. The Cartesian coordinates approach codes the block position (eob_x,eob_y) directly. The interleaving approach interleaves the coding of a last_sig_flag (indicating whether a significant coefficient is the last significant coefficient) with a sig_flag_coding (indicating whether a coefficient is a significant coefficient).

In the case where the transform block is sparse with relatively few non-zero coefficients, the interleaving approach can be more efficient. For example, if the transform block includes only one non-zero coefficient at block location (4, 5), the interleaving approach encodes and decodes exactly one last_sig_flag; on the other hand, the Cartesian coordinates approach encodes and decodes 12 bins (i.e., binary decisions). The 12 bins corresponding to, as described with respect to FIG. 8 above, the encoding of the binary strings 111100 (i.e., eob_x=4) and 111101 (i.e., eob_y=5).

On the other hand, in the case where the block includes a relatively large number of non-zero coefficients, the Cartesian coordinates approach can be more efficient. For example, in the worst case (i.e., where every coefficient of the block is non-zero), for a 16×16 block, the number of last_sig_flags to be coded using the interleaving approach is 255. On the other hand, using the Cartesian coordinates approach, the number of bins to be coded for an eob position in the 16×16 block is the number of bins corresponding to the block position (15, 14) or (14, 15). Note that, as described above, if the EOB is at (15, 15), then last_sig_flag need not be coded. The values 14 and 15, using the tree 800 are binarized into prefix strings 11111110 and the suffixes 10 and 11, or the binary strings 1111111010 and 1111111011, respectively. This results in the coding of a total of 20 bins. As such, in the worst case, the Cartesian coordinates approach is computationally less complex than that of the interleaving approach.

Figure 9:
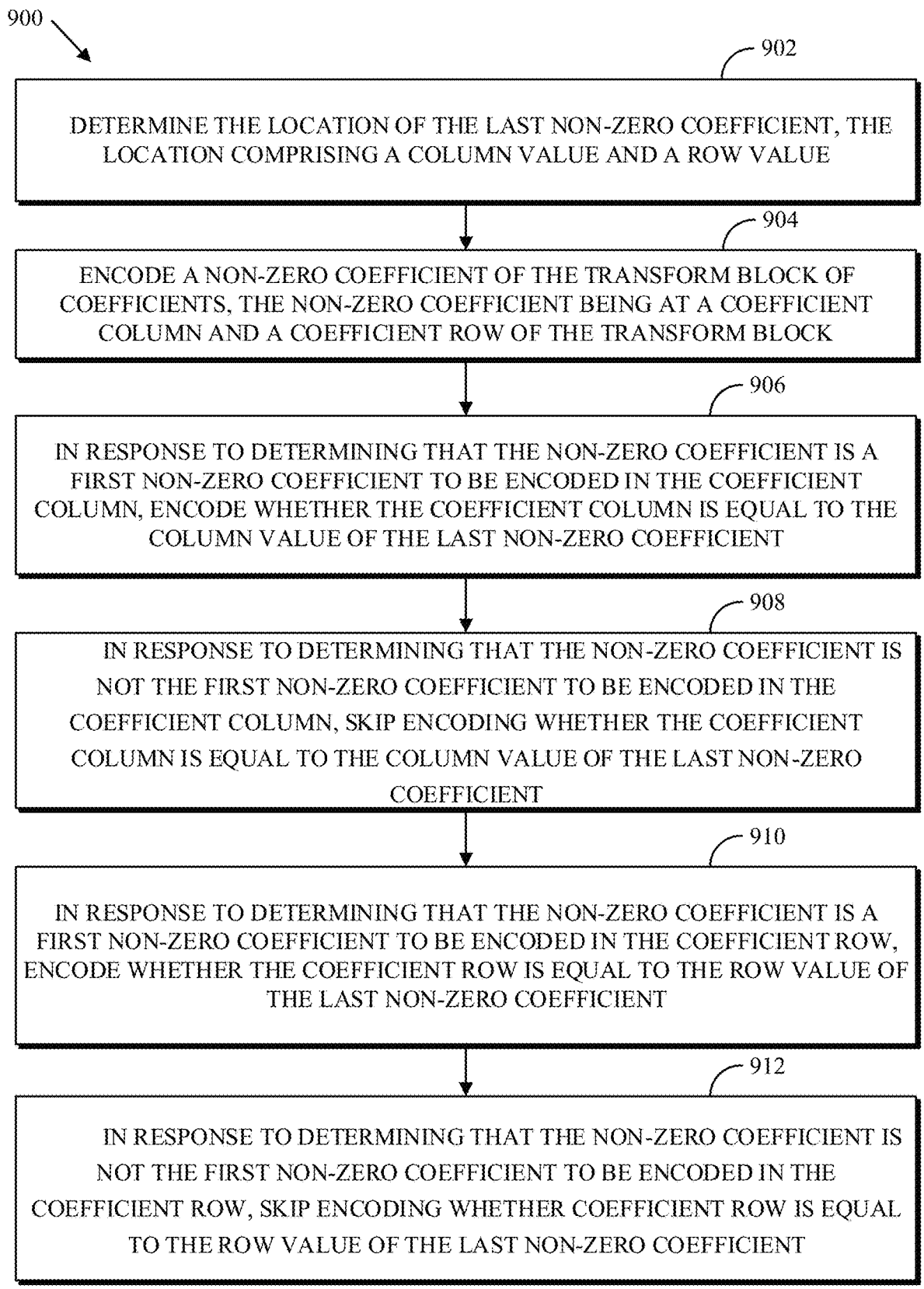
FIG. 9 is a flowchart diagram of a process for encoding the location of the last non-zero coefficient of a transform block of coefficients according to an implementation of this disclosure.

FIG. 9 is a flowchart diagram of a process 900 for encoding the location of the last non-zero coefficient of a transform block of coefficients according to an implementation of this disclosure. The process 900 can encode the coefficients of a transform block according to a scan order. Alternatively, the process 900 can be invoked by, or embedded in, another process that encodes the coefficients of a transform block. The process 900 encodes information regarding the EOB position.

The process 900 can be implemented in an encoder such as the encoder 400 of FIG. 4. The process 900 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 900. In at least some implementations, the process 900 can be performed in whole or in part by the entropy encoding stage 408 of the encoder 400 of FIG. 4.

The process 900 is described with reference to FIG. 10. FIG. 10 is an example of a scan order 1000 and a block 1050 according to implementations of this disclosure. The block 1050 can be a block of quantized transform coefficients.

The scan order 1000 can be as described with respect to scan order 602 of FIG. 6. For example, scan index 1002 indicates that coefficient 1052 (i.e., the coefficient at location (6, 0)) of the block 1050 is at scan index value 21, scan index 1004 indicates that coefficient 1054 (i.e., the coefficient at location (2, 2)) of the block 1050 is at scan index value 12, and scan index 1006 indicates that coefficient 1056 (i.e., the coefficient at location (6, 2)) of the block 1050 is at scan index value 37. The coefficient 1056 is the last non-zero coefficient of the block 1050 given the scan order 1000. That is, the coefficient corresponding to the scan index 1006 (i.e., scan index value 37) is the last non-zero coefficient.

At 902, the process 900 determines the location of the last non-zero coefficient. As used in this disclosure, "determine" means to select, construct, determine, specify, identify, receive, or other determine in any manner whatsoever. The location of the last non-zero coefficient can be as described with respect to the block position (eob_x, eob_y) above. As such, the location includes a column value (e.g., eob_x indicating the column number of the EOB coefficient). The location includes a row value (e.g., eob_y indicating the row number of the EOB coefficient). Herein, column value and column number are used interchangeably; and row value and row number are used interchangeably.

In an example, the process 900 can scan the coefficients of the block (e.g., the block 1050) according to a scan order (e.g., the scan order 1000) to determine the last non-zero coefficient. Once the last non-zero coefficient is identified, the location of the last non-zero coefficient is determined. In another example, the process 900 can determine the location of the last non-zero coefficient by receiving the location from another module, coding stage, process, or the like.

At 904, the process 900 encodes a non-zero coefficient of the transform block of coefficients. The non-zero coefficient being at a coefficient column and a coefficient row of the transform block. In an example, the process 900 may not encode the non-zero coefficient but merely receive the coefficient column and the coefficient row. Receive, can mean generate, determine, or in any way receive. For example, after or before a coefficient (e.g., coefficient at scan order value 23) is encoded, the process 900 can receive the coefficient column (i.e., 4) and the coefficient row (i.e., 2).

At 906 (further described below with respect to sequence 1118-1126 of FIG. 11), in response to determining that the non-zero coefficient is a first non-zero coefficient to be encoded in the coefficient column, the process 900 encodes whether the coefficient column is equal to the column value of the last non-zero coefficient. At 908 (further described below with respect to the block 1118 of FIG. 11), in response to determining that the non-zero coefficient is not the first non-zero coefficient to be encoded in the coefficient column, the process 900 skips encoding whether the coefficient column is equal to the column value of the last non-zero coefficient.

At 910 (further described below with respect to sequence 1128-1136 of FIG. 11), in response to determining that the non-zero coefficient is a first non-zero coefficient to be encoded in the coefficient row, the process 900 encodes whether the coefficient row is equal to the row value of the last non-zero coefficient. At 912 (further described below with respect to block 1128 of FIG. 11), in response to determining that the non-zero coefficient is not the first non-zero coefficient to be encoded in the coefficient row, the process 900 skips encoding whether coefficient row is equal to the row value of the last non-zero coefficient.

In an example of the process 900, the transform block of coefficients is a transform block of a residual block predicted using an intra-prediction. That is, the process 900 can be used with an intra-predicted block but not an inter-predicted block. In an example, the transform block of coefficients is a transform block of a block of luminance color components. That is, the process can be used for luminance blocks but not chrominance. In an example, the process 900 can be used with some block sizes but not others. For example, the process 900 can be used for transform blocks of size 4×4, but not larger.

Other implementations of improved coding of last significant coefficient flags as shown in FIG. 9 are available. In implementations, additional elements of improved coding of last significant coefficient flags can be added, certain elements can be combined, and/or certain elements can be removed.

Figure 11:
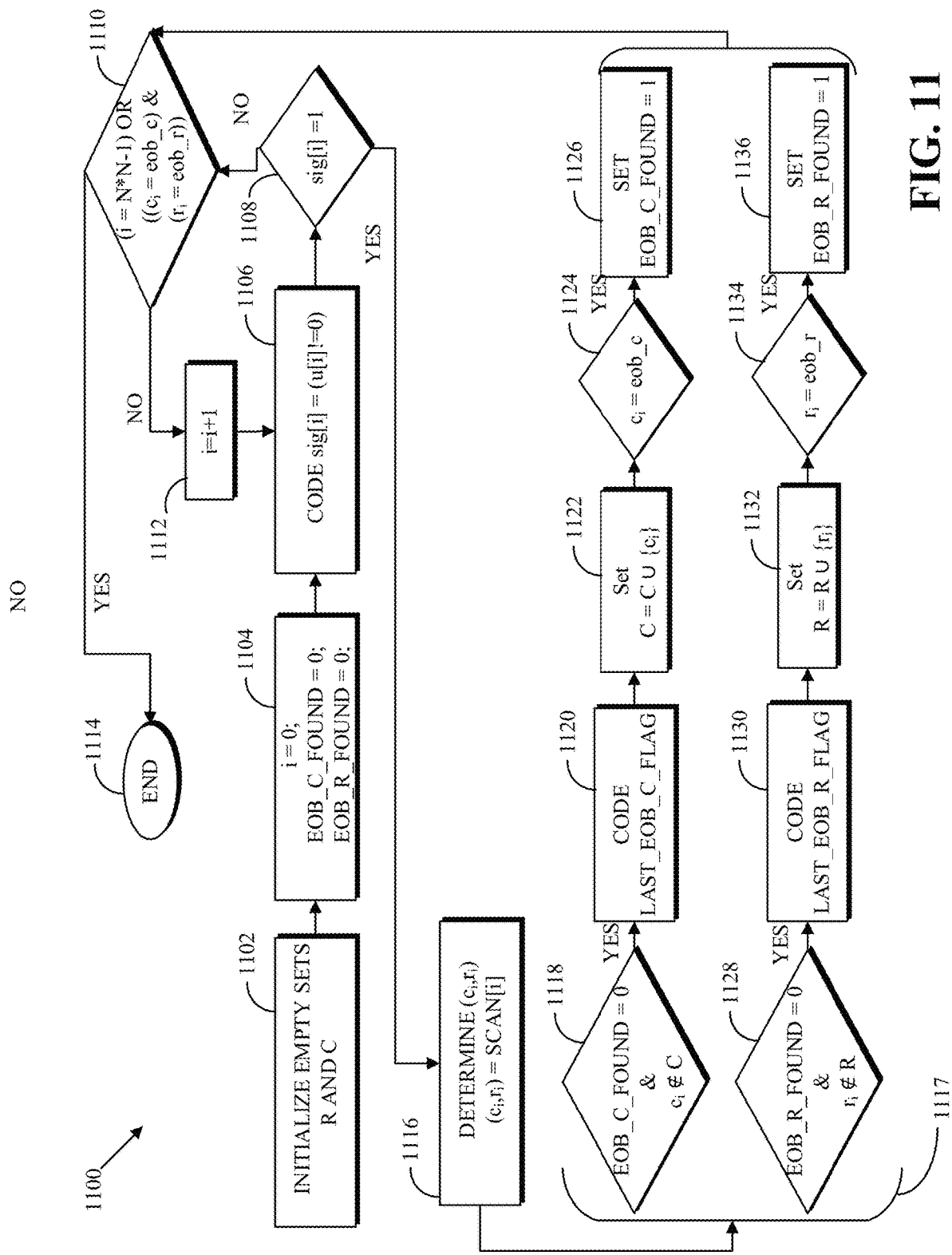
FIG. 11 is a flowchart diagram of a process for coding, using a Cartesian coordinate system, the location of the last non-zero coefficient of a transform block of coefficients according to an implementation of this disclosure.

FIG. 11 is a flowchart diagram of a process 1100 for coding, using a Cartesian coordinate system, the location of the last non-zero coefficient of a transform block of coefficients according to an implementation of this disclosure. The process 1100 codes (i.e., encodes or decodes) only once whether a column that includes a non-zero transform coefficient is the column that includes the last non-zero coefficient. The process 1100 codes (i.e., encodes or decodes) only once whether a row that includes a non-zero transform coefficient is the row that includes the last non-zero coefficient. The process 1100 can be used by, or in conjunction with, a process that codes the coefficients of a transform block according to a scan order.

The Cartesian coordinate system of the process 1100 can have its origin at the DC coefficients of a transform block. The dimensions of the Cartesian coordinate system are the rows and columns. The transform coefficients of the transform block are arranged along row values and column values. For example, in the transform block 1050, the rows have row values 0-7 and the columns have values 0-7; the coefficient 1054 is at column value 2 and row value 2. The location of the last non-zero coefficient (e.g., the coefficient 1056 of FIG. 10) includes a column value (e.g., the column value 6) and a row value (e.g., the row value 2). As described above, the last non-zero coefficient can be determined with respect to a scan order. That is, the coefficient 1056 is the last non-zero coefficient if the coefficients of the transform block 1050 are scanned according to the scan order 1000. A different coefficient (i.e., other than coefficient 1056) may be identified as the last non-zero coefficient if, for example, a scan order, other than the scan order 1000 is used.

The process 1100 can be implemented in an encoder such as the encoder 400 of FIG. 4. The process 1100 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 1100. In at least some implementations, the process 1100 can be performed in whole or in part by the entropy encoding stage 408 of the encoder 400 of FIG. 4.

The process 1100 can be implemented in a decoder such as the encoder 500 of FIG. 5. The process 1100 can be implemented, for example, as a software program that can be executed by computing devices such as receiving station 106. The software program can include machine-readable instructions that can be stored in a memory such as the memory 204 or the secondary storage 214, and that can be executed by a processor, such as CPU 202, to cause the computing device to perform the process 1100. In at least some implementations, the process 1100 can be performed in whole or in part by the entropy decoding stage 502 of the decoder 500 of FIG. 5.

When implemented by an encoder, "coding" means encoding in an encoded bitstream, such as the compressed bitstream 420 of FIG. 4. When implemented by a decoder, "coding" means decoding from an encoded bitstream, such as the compressed bitstream 420 of FIG. 5.

In the following description, a block (e.g., the transform block 1050) of size N×N is assumed; however, the block can also be a rectangular block of size M×N, where M and N are not equal. The one-dimensional array u is as described with respect to FIG. 6. As such, u[i] indicates a transform coefficient at the $i^{th}$ scan position following a given scan order (e.g., the scan order 1000 of FIG. 10). For example, u[21] (i.e., the value of the coefficient at scan position 21 (i.e., the scan index 1002) is the coefficient value −1 (i.e., the coefficient 1052).

For a scan index (i.e., a value of the scan order 1000), an array scan can provide the corresponding column number and row number in the block 1050. As such, scan[i] denotes the mapping from scan position i to block position. The block position can be a tuple including the column number and row number of the coefficient (i.e., ($c_i$, $r_i$) where $c_i$ denotes the column number or column value; and $r_i$ denotes the row number or row value). For example, scan[37] can provide the tuple (6, 2). The mapping from a scan index to a block location can be provided by means other than the scan array. For example, a function (or the like) that takes as input a scan index can provide (e.g., return) the block location.

The tuple (eob_c, eob_r) denotes the block position (i.e., the column value and the row value) of the last significant coefficient in the current block following a given scan order. As such, and referring to FIG. 10, (eob_c, eob_r) is given by the tuple (6, 2).

At 1102, the process 1100 initializes a row set R to an empty set and initializes a column set C to an empty set. The row set R keeps track of rows (i.e., row values) already visited by the process 1100. The column set C keeps track of columns (i.e., column values) already visited by the process 1100. A visited row, in this context, means that when a current non-zero coefficient is visited given the scan order, another non-zero coefficient is already determined to be in the same row as the current non-zero coefficient. A visited column, in this context, means that when a current non-zero coefficient is visited given the scan order, another non-zero coefficient is already determined to be in the same column as the current non-zero coefficient. For example, in the scan order 1000, when the scan index 1010 (i.e., the scan index value 3) is processed (i.e., corresponding to coefficient 1060), the row 0 is determined to have been visited (i.e., the row set R includes the row 0) since another non-zero coefficient (i.e., coefficient 1058 corresponding to scan index 1008) is already determined to be in the same row (i.e., row 0): both coefficients 1058 and 1060 are in the same row 0 and the coefficient 1058 is processed before the coefficient 1060 in the scan order.

At 1104, a scan position i is initialized to zero; and flags EOB_C_FOUND and EOB_R_FOUND are set to false (i.e., the value zero). The scan position i is used as an index into the one-dimensional array u. The flag EOB_C_FOUND indicates whether a transform coefficient that is in the same column as the end-of-block coefficient has been processed (i.e., visited according to the scan order). The flag EOB_R_FOUND indicates whether a transform coefficient that is in the same row as the end-of-block coefficient has been processed.

At 1106, the process 1100 codes, and can set sig[i] to, whether the coefficient corresponding to the scan index u[i] is a zero or non-zero coefficient. The sig data structure (e.g., an array, a flag, etc.) indicates whether the coefficient at scan index i is zero or not. In this example, a non-zero coefficient is indicated with a value of one (1) (i.e., sig[i]=1). However, other values are possible. As indicated above, when implemented in an encoder, coding whether the coefficient corresponding to the scan index u[i] is zero or non-zero can mean outputting into an encoded bitstream a syntax element (e.g., a 0 or a 1 bit) indicating whether the coefficient is zero or non-zero. When implemented in a decoder, coding whether the coefficient corresponding to the scan index u[i] is a zero or non-zero can mean reading from an encoded bitstream a syntax element (e.g., a 0 or a 1 bit) indicating whether the coefficient is zero or non-zero.

At 1108, if the coefficient is not a non-zero coefficient (i.e., sig[i]=1), then the process 1100 proceeds to 1110; otherwise the process 1100 proceeds to 1116. Said another way, if the coefficient at scan index i is zero, then the process 1100 proceeds, at 1110, to determine whether a next coefficient is to be processed; otherwise, the process 1100 further processes the current coefficient.

At 1110, if all the coefficients of the transform block have been processed (i.e., the scan position i=N*N−1) or, if the current coefficient is the end-of-block coefficient (i.e., if $c_i$=eob_c and $r_i$=eob_r), then the process 1100 terminates at 1114; otherwise the process continues at 1112. At 1112, the process 1100 increments the scan position i to process the next coefficient.

At 1116, the process 1100 determines the column value (i.e., $c_i$) and row value (i.e., $r_i$) of the transform coefficient at the scan position i. The column value and row value can be determined using the array scan described above. As such, at 1116, the tuple ($c_i$, $r_i$) is determined. At 1117, the process 1100 processes the two branches given by the sequence 1118-1126 and the sequence 1128-1136. In an example, the two branches can be processed sequentially. In another example, the two branches can be processed in parallel.

At 1118, if the column of the last non-zero coefficient has not already been found (i.e., EOB_C_FOUND=0) and the column (i.e., the column value $c_i$) of the current coefficient has not already been visited (i.e., the column value $c_i$ is not included in the column set C), then the process 1100 proceeds to 1120; otherwise, the sequence 1118-1126 is skipped.

At 1120, the process 1100 can code a flag LAST_EOB_C_FLAG. The flag LAST_EOB_C_FLAG indicates whether the column of the current non-zero coefficient is the column of the last non-zero coefficient. For example, when implemented by an encoder, the process 1100 can encode the value $c_i$=eob_c. As such, a bit corresponding to the Boolean value $c_i$=eob_c can be encoded. When implemented in a decoder, the process 1100 can decode a syntax element from which the flag LAST_EOB_C_FLAG can be set. A zero (0) can be coded when the column of the current coefficient is not the same as the column of the last non-zero coefficient; otherwise, a one (1) is coded. Again, as described above, when implemented by an encoder, to code means to encode in an encoded bitstream; and when implemented by a decoder, to code means to decode from an encoded bitstream.

At 1122, the column value $c_i$ is added to the column set C to indicate that the column value $c_i$ has been visited so that when/if another non-zero transform coefficient having the column value $c_i$ is visited, the process 1100 can skip the sequence 1118-1126 and, consequently, skip coding (at 1120) another value indicating whether the column value ci includes the last non-zero transform coefficient of the block.

At 1124, if the column value $c_i$ is equal to the column value of the last non-zero coefficient (i.e., when $c_i$=eob_c or, equivalently, when LAST_EOB_C_FLAG=1), then the process 1100 sets (at 1126) the flag EOB_C_FOUND to true (e.g., EOB_C_FOUND=1). When implemented by a decoder, the process 1100, at 1126, can also record that the column value $c_i$ is the column value of the last non-zero coefficient (i.e., eob_c). The process 1100 then proceeds to 1110 when the two branches of 1117 are completed.

In the sequence 1128-1136, the process 1100 performs similar steps to those of the branch 1118-1136. The block 1128 can be the same as the block 1118, except that EOB_R_FOUND, row value $r_i$, and row set R are used instead of EOB_C_FOUND, column value $c_i$, and column set C, respectively. The block 1130 can be the same as the block 1120, except that instead of coding a LAST_EOB_C_FLAG, the process 1100 codes a LAST_EOB_R_FLAG indicating whether the row of the current non-zero coefficient is the row of the last non-zero coefficient. The block 1132 can be the same as the block 1122, except that row set R and the row value $r_i$ are used instead of the column set C and the column value $c_i$. The block 1134 can be the same as the block 1124, except that instead of comparing the column value $c_i$ to the eob_c, the row value $r_i$ is compared to the row value of the last non-zero coefficient, eob_r. The block 1136 can be the same as the block 1126, except that instead of setting the EOB_C_FOUND flag, the EOB_R_FOUND flag is set and, when implemented by a decoder, the process 1100 can also record that the row value $r_i$ is the row value of the last non-zero coefficient (i.e., eob_r).

The process 1100 can be alternately stated as follows:
Step 1: Initialize two empty sets R and C. Furthermore, initialize i=0,
EOB_C_FOUND=0, and EOB_R_FOUND=0.
Step 2: Encode or decode (u[i] !=0), i.e. the significant_coef_flag sig[i] at scan position i.
Step 3: If sig[i]=1, determine ($c_i$, $r_i$)=scan[i], and do the following.
  a. If EOB_C_FOUND=0 and if $c_i \notin C$, encode or decode a LAST_EOB_C_FLAG indicating whether (eob$_c$=$c_i$) or not, and set C=C∪{$c_i$}. If eobc is equal to ci (i.e., LAST_EOB_C_FLAG=1), then set EOB_C_FOUND=1, and record eobc (in the decoder).
  b. If EOB_R_FOUND=0 and if $r_i \notin R$, encode or decode a LAST_EOB_R_FLAG indicating whether (eob$_r$=$r_i$) or not, and set R=R∪{$r_i$}. If eob$_r$ is equal to $r_i$ (i.e., LAST_EOB_R_FLAG=1), then set EOB_R_FOUND=1, and record eob$_r$ (in the decoder).
Step 4: Increase i by 1.
Step 5: Repeat Steps 2-4 until either of the following two conditions is met:
  I=N*N, or
  both eob$_c$=$c_{i-1}$, and eob$_r$=$r_{i-1}$ Table 1 illustrates the results of processing, by the branches 1117 of the process 1100, of the non-zero coefficients of the block 1050 according to the scan order 1000. As indicated above, the last non-zero coefficient, given the scan order 1000, is the coefficient 1056.

TABLE 1

| i | LAST_EOB_C_FLAG | LAST_EOB_R_FLAG | Column Set C | Row Set R | EOB_C_FOUND | EOB_R_FOUND |
|---|---|---|---|---|---|---|
| 0 | 0 | 0 | {0} | {0} | | |
| 1 | | 0 | | {0, 1} | | |
| 2 | 0 | | {0, 1} | | | |
| 6 | | 0 | | {0, 1, 3} | | |
| 12 | 0 | 1 | {0, 1, 2} | {0, 1, 2, 3} | | 1 |
| 21 | 1 | | {0, 1, 2, 6} | | 1 | |
| 37 | The process terminates at 1112 since $eob_c = c_i$ and $eob_r = r_i$ | | | | | |

Using the scan order 1000, the one-dimensional array u includes the values u[0-37]={8, 2, 3, 0, 0, 0, 1, 0, 0, 0, 0, 0, 1, 0, 0, 0, 0, 0, 0, 0, −1, 2, 1, 0, 0, 0, 0, 0, 0, 0, 0, 0, 1, 1, 0, 0, 1}. The values u[0-37] is the subset of the u array up to and including the last non-zero coefficient (i.e., the coefficient 1056). The values u[0-37] include 11 non-zero coefficients. As can be seen from Table 1, the LAST_EOB_C_FLAG is coded four (4) times and the LAST_EOB_R_FLAG is coded four (4) times. Contrastingly, a system that implements the interleaving approach codes 11 times whether a non-zero coefficient is the last non-zero coefficient; and a system that implements the Cartesian coordinates approach, codes, using context-based coding, the seven bins of 1111100 (i.e., the column value 6) and the three bins of 110 (i.e., the row value 2).

In an implementation, the process 1100 can skip coding the flag LAST_EOB_C_FLAG at 1120 when the column set C includes N−2 elements (i.e., the cardinality of the column set C, |C|, is equal to N−1). If the column set C includes N−1 elements, and the process 1100 is at block 1120, then it must be the case that none of the N−1 column values in the column set C includes the last non-zero coefficient. Depending upon the scan order, column indices in the column set C may not necessarily be added in sequential order. That is, a larger index might be added before a smaller index in some scan orders. Additionally, since the process 1100 is at 1120, then it must be the case that the column value $c_i$ includes at least one non-zero coefficient (since sig[i]=1 at block 1108). As such, the current column, which is also the last remaining column outside of the column set C, can be inferred to contain the last non-zero coefficient of the block. As such, coding LAST_EOB_C_FLAG can be skipped. Similarly, the process 1100 can skip coding the flag LAST_EOB_R_FLAG at 1130 when the row set R includes N−1 elements (i.e., the cardinality of the row set R, |R|, is equal to N−1).

In the case where every coefficient of an N×N block is a non-zero coefficient, implementations according to this disclosure code (encode and/or decode) N−1 LAST_EOB_C_FLAGs (i.e., one flag per column) and N−1 LAST_EOB_R_FLAGs (i.e., one flag per row). In contrast, the interleaving approach codes N*N−1 LAST_SIG_FLAGs (i.e., one flag for every non-zero coefficient). The Cartesian coordinates approach codes 6 bins (3 bins for each of the column and the row values) if N=4; 12 bins if N=8, 18 bins if N=16, and 24 bins if N=32. Table 2 summarizes the worst case complexity (i.e., number of value) for different values of N.

TABLE 2

| N | Interleaving Approach | Cartesian coordinates approach | Implementations according to this disclosure |
|---|---|---|---|
| 4 | 15 | 6 | 6 |
| 8 | 63 | 12 | 14 |

TABLE 2-continued

| N | Interleaving Approach | Cartesian coordinates approach | Implementations according to this disclosure |
|---|---|---|---|
| 16 | 255 | 18 | 30 |
| 32 | 1023 | 24 | 63 |

As Table 2 illustrates, implementations according this disclosure can provide improvements over the interleaving approach in terms of the worst-case complexity as measured in the highest number of bins to be encoded and decoded in an N×N block.

As described above, Table 2 indicates that the differences, in the worst-case complexity, between implementations according to this disclosure and the interleaving approach grow as the block size increases. In addition, as described above, the interleaving approach works better for sparse transform blocks. As such, implementations according to this disclosure can selectively choose an encoding approach (i.e., between an approach disclosed herein and the interleaving approach). For example, for small blocks (e.g., 4×4 blocks), the interleaving approach can be used to code (i.e., encode and/or decode) eob positions, whereas, an approach as disclosed herein can be used for larger blocks (e.g., 8×8 blocks or larger). In another example, the choice of which approach to use can depend upon color components. For example, an approach as disclosed herein can be used for luminance blocks whereas the Cartesian coordinates approach or the interleaving approach can be used for chrominance blocks (which are typically sparse). In yet another example, the choice can depend upon picture types and/or coding modes. For example, an approach as disclosed herein can be used for intra-coded blocks, and the Cartesian coordinates approach or interleaving approach can be used for inter-coded blocks. In another example, the choice can depend upon the statistics from previously decoded blocks, making the selection adaptive to data itself. In a further example, the choices can be signaled in a picture/frame header and for blocks within the picture/frame, the signaled choice for those blocks is used.

Figure 12:
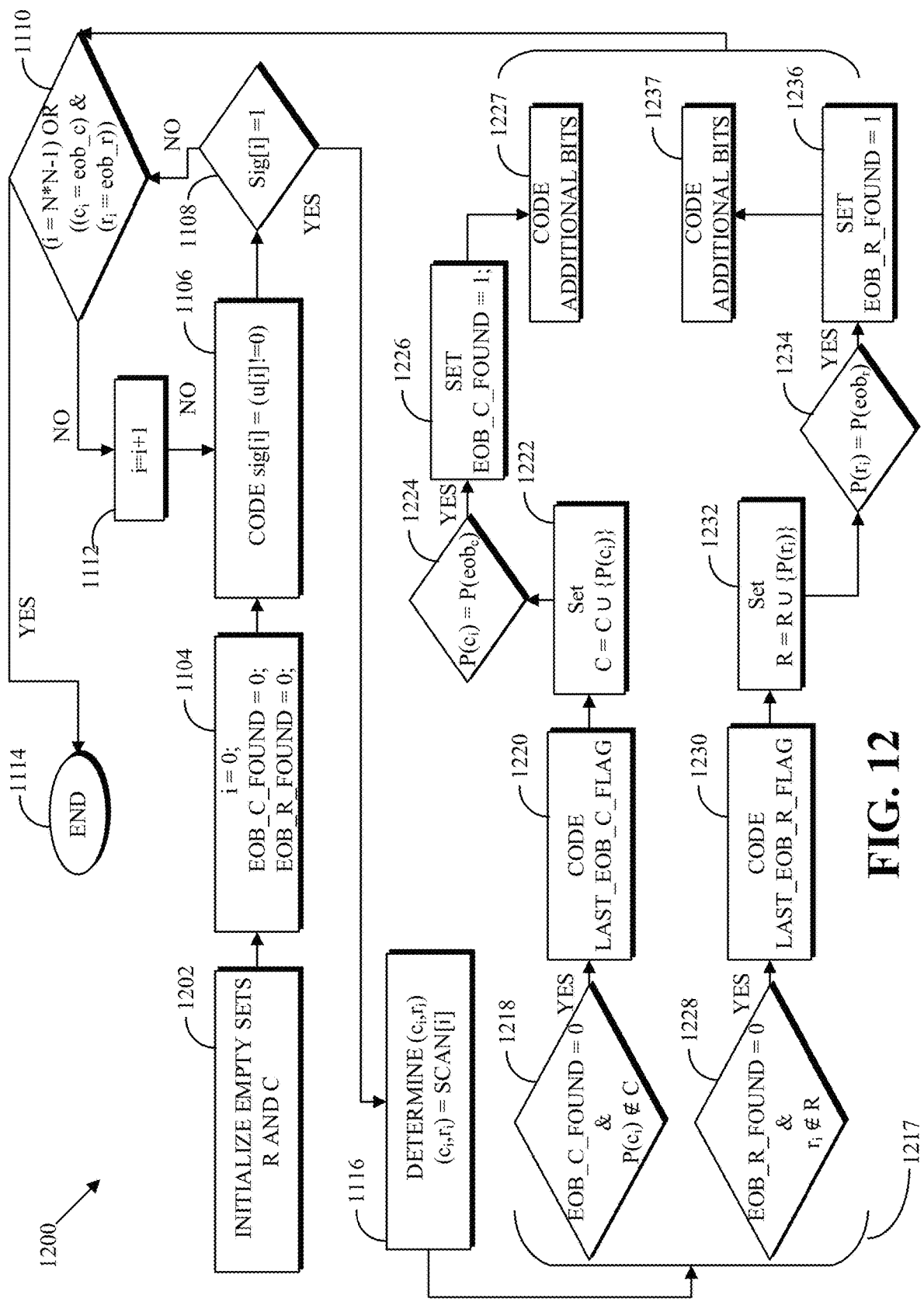
FIG. 12 is a flowchart diagram of a process for coding, using a Cartesian grouping coordinate system, the location of the last non-zero coefficient of a transform block of coefficients according to an implementation of this disclosure.

FIG. 12 is a flowchart diagram of a process 1200 for coding, using a Cartesian grouping coordinate system, the location of the last non-zero coefficient of a transform block of coefficients according to an implementation of this disclosure. In the Cartesian grouping coordinate system, column values of the transform block are grouped into column groups and the row values of the transform block are grouped into row groups. The process 1200 can code the column value of the last non-zero coefficient by indicating the column group that includes the column value and the index, within the group of the column value. The process 1200 codes whether a column group that includes a non-zero transform coefficient, includes the non-zero transform coefficient.

The process 1200 can share aspects of the process 1100. Descriptions are omitted for blocks of the process 1200 that are numbered as the blocks of the process 1100.

In an example, the process 1200 can be used in cases where the transform block includes a relatively high number of non-zero transform coefficients. That is, the process 1200 can be used when the transform block is dense. In an example, when the number of non-zero transform coefficients in a block exceeds a given threshold, then the process 1200 can be executed for coding the location of the last non-zero coefficient of a transform block; otherwise, the process 1100, or another process disclosed herein, can be executed. Alternatively, an embodiment may incorporate the processes 1100 and 1200. Accordingly, the unique aspects of the process 1200 can be carried out when the number of non-zero transform coefficients exceeds the given threshold; otherwise, the unique aspects of the process 1100 can be carried out.

The process 1200 can provide coding improvements over the process 1100 in the case of dense transform blocks. The process 1200 can match or approach the performance of the Cartesian coordinates approach in terms of the worst-case complexity (described above).

To illustrate the column groups and row groups, for a block of size N×N, let P denote a mapping from the numbers $\{0, \ldots, N-1\}$ to the group numbers $\{0, 1, \ldots, G-1\}$, where G is the number of groups. In an example, a first mapping can be defined for the column values and a second mapping can be defined for the row values. In an example where N≤32, the mapping P can be given by:

$P(i)=i$ if $i<4$ $P(i)=4$ if $4 \leq i<6$ $P(i)=5$ if $6 \leq i<8$ $P(i)=6$ if $8 \leq i<12$ $P(i)=7$ if $12 \leq i<16$ $P(i)=8$ if $16 \leq i<24$ $P(i)=9$ if $24 \leq i<32$ Using the above mapping, the column value 15 (i.e., $12 \leq i<16$) can be mapped to the column group number 7 (i.e., P(15)=7); the row value 3 (i.e., i<4) can be mapped to the row group number 3 (i.e., P(3)=3). More or less groups can be available. The number of groups can depend on the block size. In an example where N=64, the above mapping can be extended to include:

$P(i)=10$ if $32 \leq i<48$ $P(i)=11$ if $48 \leq i<64$

Using the above mappings, the coefficient 1056 of FIG. 10 maps to the column group number 5 and is in the 0th column within the column group number 5. The column group number 5 includes the columns 6 and 7 of the block 1050. Different mappings can be available. Different mappings can lead to different worst-case complexity in terms of the numbers of times syntax elements relating to the end-of-clock coefficient are coded.

Differences between the process 1200 and the process 1100 are now explained. While not shown in FIG. 12, the process 1200 can determine the column group $eob_c$ and row group $eob_r$ of the last non-zero coefficient.

At 1202, the process 1200 initializes a column group set C to an empty set and initializes a row group set R to an empty set.

The column group set C keeps track of column groups already visited by the process 1200. A visited column group, in this context, means that when a current non-zero coefficient is visited given the scan order, another non-zero coefficient is already determined to be in the same column group as the current non-zero coefficient. For example, in the scan order 1000, when the scan index value 23 is processed (i.e., corresponding to coefficient value 1 at block position (4, 2)), the column group number 4 is determined to have been visited (i.e., the column group set C includes the column group number 4) since another non-zero coefficient (i.e., the coefficient at block position (5, 1) corresponding to scan index value 22) is already determined to be in the same column group (i.e., column group 4).

The row group set R keeps track of row groups already visited by the process 1200. A visited row group, in this context, means that when a current non-zero coefficient is visited given the scan order, another non-zero coefficient is already determined to be in the same row group as the current non-zero coefficient.

After the block 1116 of FIG. 12, the process 1200 proceeds to 1217. At 1217, the process 1200 processes the two branches given by the sequence 1218-1227 and the sequence 1228-1237. In an example, the two branches can be processed sequentially. In another example, the two branches can be processed in parallel.

At 1218, if the column group of the last non-zero coefficient has not already been found (i.e., EOB_C_FOUND=0) and the column group that includes the column value of the current coefficient (i.e., the column group $P(c_i)$) has not already been visited (i.e., the column group value $P(c_i)$ is not included in the column group set C), then the process 1200 proceeds to 1120. Otherwise, the sequence 1220-1127 is skipped.

At 1220, the process 1200 can code a flag LAST_EOB_C_FLAG. The flag LAST_EOB_C_FLAG indicates whether the column group of the current non-zero coefficient is the column group that includes the last non-zero coefficient. For example, when implemented by an encoder, the process 1200 can encode the value $P(c_i)=P(eob_c)$. When implemented in a decoder, the process 1100 can decode a syntax element from which the flag LAST_EOB_C_FLAG can be set. A zero (0) can be coded when the column group of the current coefficient is not the same as the column group of the last non-zero coefficient; otherwise, a one (1) is coded. Again, as described above, when implemented by an encoder, to code means to encode in an encoded bitstream; and when implemented by a decoder, to code means to decode from an encoded bitstream.

At 1222, the column group value $P(c_i)$ is added to the column set C to indicate that the column group $P(c_i)$ has been visited so that when/if another transform coefficient having the column group value $P(c_i)$ is visited, the process 1200 can skip the sequence 1220-1227 and, consequently, skip coding (at 1220) another value indicating whether the column group $P(c_i)$ includes the last non-zero transform coefficient of the block.

At 1224, if the column group value $P(c_i)$ is equal to the column group value of the last non-zero coefficient (i.e., when $P(c_i)=P(eob\_c)$ or, equivalently, when LAST_EOB_C_FLAG=1), then the process 1200 sets (at 1226) the flag EOB_C_FOUND to true (e.g., EOB_C_FOUND=1).

When implemented by a decoder, the process 1200, at 1226, can also record that the column group value $P(c_i)$ is the column group value of the last non-zero coefficient (i.e., $P(eob_c)$). At 1227, the process 1200 codes additional bits when $P(c_i) \geq 4$ in order to reconstruct the column of the last non-zero coefficient, $eob_c$. For example, and referring to FIG. 10, as the last non-zero coefficient (i.e., the coefficient 1056) is in the column group number 5 (which includes the column values 6 and 7 according to the above mapping) and is in the first column within the group, the process 1200 can code an additional bit (e.g., a value of zero 0). The additional bits coded at 1227 can depend on the number of columns in the group. The process 1200 then proceeds to 1110 when the two branches of 1217 are completed.

In the sequence 1228-1237, the process 1200 performs similar steps to those of the branch 1218-1237. The block 1228 can be the same as the block 1218, except that EOB_R_FOUND, row group $P(r_i)$, and row group set R are used instead of EOB_C_FOUND, column group $P(c_i)$, and column group set C. The block 1230 can be the same as the block 1220, except that instead of coding a LAST_EOB_C_FLAG, the process 1200 codes a LAST_EOB_R_FLAG indicating whether the row group of the current non-zero coefficient is the row group of the last non-zero coefficient. The block 1232 can be the same as the block 1222, except that row group set R and the row group value $P(r_i)$ are used instead of the column group set C and the column group value $P(c_i)$. The block 1234 can be the same as the block 1224, except that instead of comparing the column group value $P(c_i)$ to the column group value of the last non-zero coefficient ($P(eob_c)$), the row group value $P(r_i)$ is compared to the row group value of the last non-zero coefficient ($P(eob_r)$). The block 1236 can be the same as the block 1226 except that the flag EOB_R_FOUND instead of the flag EOB_C_FOUND. The block 1237 can be the same as the block 1227, except that the additional bits are coded to reconstruct the row of the last non-coefficient coefficient.

Figure 13:
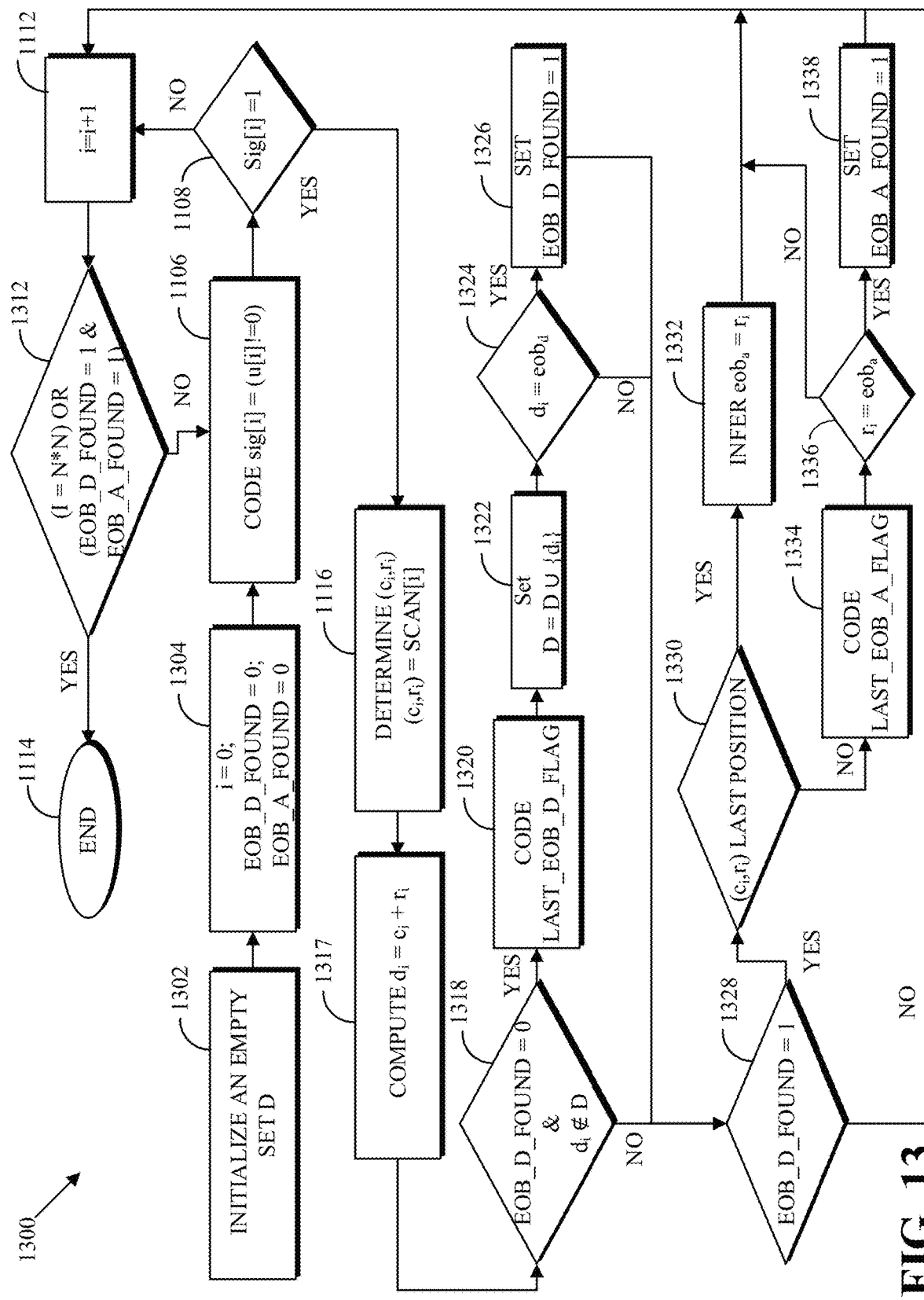
FIG. 13 is a flowchart diagram of a process for coding, using a polar coordinate system, the location of the last non-zero coefficient of a transform block of coefficients according to an implementation of this disclosure.

FIG. 13 is a flowchart diagram of a process 1300 for coding, using a polar coordinate system, the location of the last non-zero coefficient of a transform block of coefficients according to an implementation of this disclosure. The process 1300 is similar to the processes 1100 and 1200 described above. However, the process 1300 uses a polar coordinate system. The polar coordinate system of the process 1300 is further explained with respect to FIG. 15 and the block 1050 of FIG. 10.

FIG. 15 is an example of a polar coordinate system 1500 according to implementations of this disclosure. FIG. 15 duplicates the scan order 1000 of FIG. 10. The polar coordinate system 1500 can be characterized by an origin and diagonal lines. In an example, the origin can be the DC coefficient (i.e., the coefficient 1058) of the block 1050. That is, the origin can correspond to the scan index value 0 (i.e., scan index 1504).

As indicated above, each coefficient of the block 1050 of FIG. 10 is located at a Cartesian location (col, row). For example, the coefficient 1056 is at Cartesian location (6, 2). The anti-diagonal lines of the polar coordinate system 1500 can be lines such that coefficients of the block 1050 having the same value col+row are considered to be on the same anti-diagonal line.

For example, anti-diagonal line 1502 includes those coefficients having col+row=1. As such, the coefficients corresponding to the scan index value one (1) (corresponding to the coefficient at block location (0, 1)) and the scan index value two (2) (corresponding to the coefficient at block location (1, 0)) are on the same anti-diagonal line (i.e., the anti-diagonal line 1502).

As another example, anti-diagonal line 1506 includes those coefficients of the block 1050 having col+row=4. As such, the anti-diagonal line 1506 includes the coefficients at scan positions 10, 11, 12, 13, and 14 corresponding, respectively to the coefficients at Cartesian locations (4, 0), (3, 1), (2, 2), (1, 3), and (0, 4). Similarly, anti-diagonal line 1508 includes those coefficients of the block 1050 having col+row=8. As such, the anti-diagonal line 1508 includes the coefficients at scan positions 36, 37, 38, 39, 40, 41, and 42 corresponding, respectively to the coefficients at Cartesian locations (7, 1), (6, 2), (5, 3), (4, 4), (3, 5), (2, 6), and (1, 7).

In the polar coordinate system 1500, a coefficient is described by the anti-diagonal line that includes the coefficient and the position of the coefficient on the diagonal line. That is, a coefficient can be described with a tuple (anti-diagonal line, position). In an example, the position can be given by coefficient row number. In another example, the position can be given by the column number of the coefficient. Other options for describing the position can be available.

As such, the position of the last non-zero coefficient in a transform block (e.g., the coefficient 1056 corresponding to the scan index 1006 of FIG. 10) can be described using the tuple ($eob_d$, $eob_a$). The anti-diagonal line of the coefficient 1056 can be given by $eob_d$=6+2=8. In the case where the column number of the coefficient is used for the position $eob_a$, then the coefficient 1056 can be described with the tuple (8, 6). In the case where the row number of the coefficient is used for the position $eob_a$, then the coefficient 1056 can be described with the tuple (8, 2). In the description below, the position along an anti-diagonal line is assumed to be given by the coefficient row number. Regarding the DC position as the origin, the polar coordinate system 1500 can be regarded as a discrete version of the Polar coordinate system. While not shown in FIG. 13, the process 1300 can determine the anti-diagonal line $eob_d$ and position $eob_a$ of the last non-zero coefficient.

The process 1300 codes once whether an anti-diagonal line that includes a non-zero coefficient is the anti-diagonal line that includes the last non-zero coefficient of the block given a scan order. The process 1300 codes (or can infer), for a current non-zero coefficient on the anti-diagonal line that includes the last non-zero coefficient, whether the current non-zero coefficient is the last non-zero coefficient. The process 1300 includes some of the same blocks at those of the process 1100 of FIG. 11. For simplicity, description of the similarly numbered blocks is omitted.

At 1302, the process 1300 initializes a diagonal set D to an empty set. The diagonal set D keeps track of anti-diagonal lines already visited by the process 1300. A visited anti-diagonal line, in this context, means that when a current non-zero coefficient is visited given the scan order, another non-zero coefficient is already determined to be included in the same anti-diagonal line as the current non-zero coefficient. For example, in the scan order 1000, when the scan index value 2 is processed (i.e., corresponding to coefficient value 3 at block location (1, 0)), the anti-diagonal line 1 (i.e., 1+0) is determined to have been visited (i.e., the diagonal set D includes the anti-diagonal line with value 2) since another non-zero coefficient (i.e., the coefficient at block location (0, 1) corresponding to scan index value 1) is already determined to be included in the anti-diagonal line (i.e., anti-diagonal line value 1).

At 1304, a scan position i is initialized to zero; and a flag EOB_D_FOUND and a flag EOB_A_FOUND are each set to false (e.g., the value zero). The scan position i is used as an index into the one-dimensional array u. The flag EOB_D_FOUND indicates whether a transform coefficient that falls on the same anti-diagonal line as the end-of-block coefficient has been processed (i.e., visited according to the scan order). The flag EOB_A_FOUND indicates whether the position of a current transform coefficient on the anti-diagonal line of last non-zero coefficient is the position of the last non-zero coefficient.

At 1317, the process 1300 computes the anti-diagonal line value for the current coefficient. The current coefficient is the coefficient of the transform block corresponding to the scan index value of the scan position i. Using the column value (i.e., $c_i$) and the row value (i.e., $r_i$) determined at 1116, the process 1300 computes the current anti-diagonal line $d_i$ as $d_i = c_i + r_i$.

At 1318, if the process 1300 determines that the anti-diagonal line including the last non-zero coefficient has not been determined (i.e., the flag EOB_D_FOUND=0) and the current anti-diagonal line $d_i$ has not been visited (i.e., the value $d_i$ is not in the set D), then the process 1300 proceeds to 1320; otherwise the process 1300 proceeds to 1328.

At 1320, the process 1300 codes a flag LAST_EOB_D_FLAG. The flag LAST_EOB_D_FLAG indicates whether the anti-diagonal line of the current non-zero coefficient is the anti-diagonal line of the last non-zero coefficient. For example, when implemented by an encoder, the process 1300 can encode the value $d_i = eob_d$. When implemented in a decoder, the process 1300 can decode a syntax element from which the flag LAST_EOB_D_FLAG can be set. A zero (0) can be coded when the anti-diagonal line of the current coefficient is not the same as the anti-diagonal line of the last non-zero coefficient; otherwise, a one (1) is coded. Again, as described above, when implemented by an encoder, to code means to encode in an encoded bitstream; and when implemented by a decoder, to code means to decode from an encoded bitstream.

At 1322, the anti-diagonal line value $d_i$ of the current coefficient is added to the anti-diagonal set D to indicate that the anti-diagonal line value $d_i$ has been visited so that when/if another transform coefficient having the same anti-diagonal line value $d_i$ is visited, the process 1300 can skip the branch 1320-1326 and, consequently, skip coding (at 1320) another value indicating whether the anti-diagonal value $d_i$ includes the last non-zero transform coefficient of the block.

At 1324, if anti-diagonal line value $d_i$ is equal to the anti-diagonal line value of the last non-zero coefficient (i.e., when $d_i = eob_d$ or, equivalently, when LAST_EOB_D_FLAG=1), then the process 1300 sets (at 1326) the flag EOB_D_FOUND to true (e.g., EOB_D_FOUND=1); otherwise, the process 1300 proceeds to 1328. When implemented by a decoder, the process 1300, at 1326, can also record that the anti-diagonal line value $d_i$ is the anti-diagonal line value of the last non-zero coefficient (i.e., $eob_d$). The process 1300 then proceeds to 1328.

At 1328, if the process 1300 determines that EOB_D_FOUND is set (i.e., EOB_D_FOUND=1), then the process 1300 proceeds to 1330; otherwise the process 1300 proceeds to 1112. In the sequence 1330-1338, the process 1300 codes or infers whether the position of the current non-zero coefficient on the anti-diagonal line is the position of the last non-zero coefficient. At 1328, if the flag EOB_D_FOUND is set, it means also that the anti-diagonal line value $d_i$ is the anti-diagonal line value of the last non-zero coefficient (i.e., $eob_d$); it also means that, since the current anti-diagonal line includes the last non-zero coefficient, then subsequent anti-diagonal lines include only zero coefficients. A subsequence anti-diagonal line is any anti-diagonal line $d_i+k$, where k is any value that is greater than zero (0).

At 1330, the process 1300 determines whether the current coefficient position ($c_i$, $r_i$) is the last position of the anti-diagonal line $d_i$. If not, then the process proceeds to 1334. If so, then at 1332, the process 1300 can infer (instead of encoding by an encoder or decoding by a decoder) that the position of the last non-zero coefficient (i.e., $eob_a$) is the same as the row value of the current coefficient. That is, it can be inferred that $eob_a$ is equal to $r_i$. In an example, the process 1330 can determine that the current coefficient position ($c_i$, $r_i$) is the last position of the anti-diagonal line di, by determining that $d_{i+k}$ is not equal to $d_i$ for all k>0. The process 1300 then proceeds to 1112.

At 1334, the process 1300 codes a flag LAST_EOB_A_FLAG. The flag LAST_EOB_A_FLAG indicates whether the position on the anti-diagonal line of the current non-zero coefficient is the position of the last non-zero coefficient. For example, when implemented by an encoder, the process 1300 can encode the value $r_i = eob_a$. When implemented in a decoder, the process 1300 can decode a syntax element from which the flag LAST_EOB_A_FLAG can be set. A zero (0) can be coded when the position on the anti-diagonal line of the current coefficient is not the same as the position on the anti-diagonal line of the last non-zero coefficient; otherwise, a one (1) is coded.

At 1336, the process 1300 determines whether the position value $r_i$ is equal to the position value on the anti-diagonal line $d_i$ of the last non-zero coefficient (i.e., when $r_i = eob_r$, or, equivalently, when LAST_EOB_A_FLAG=1). If not, the process 1300 proceeds to 1112. If so, the process 1300 sets (at 1338) the flag EOB_A_FOUND to true (e.g., EOB_A_FOUND=1). When implemented by a decoder, the process 1300, at 1338, can also record that the row value $r_i$ is the position along the anti-diagonal line of the last non-zero coefficient (i.e., $eob_r$). The process 1300 then proceeds to 1112.

At 1312, if all the coefficients of the transform block have been processed (i.e., the scan position i=N*N) or, if the anti-diagonal line of the last non-zero transform coefficient has been visited (i.e., EOB_D_FOUND=1) and the position of the last non-zero position on the anti-diagonal line has been found (i.e., EOB_A_FOUND=1), then the process 1300 terminates at 1114; otherwise the process continues at 1106.

As described above, the process 1300 can infer (instead of encoding by an encoder or decoding by a decoder) that the current coefficient is a non-zero coefficient when EOB_D_FOUND=1 (i.e., the current anti-diagonal line is the anti-diagonal line that includes the last non-zero coefficient) and the current coefficient position ($c_i$, $r_i$) is the last position of the anti-diagonal line. As such, the process 1300 can save the cost of encoding or decoding the value sig[i].

Figure 14:
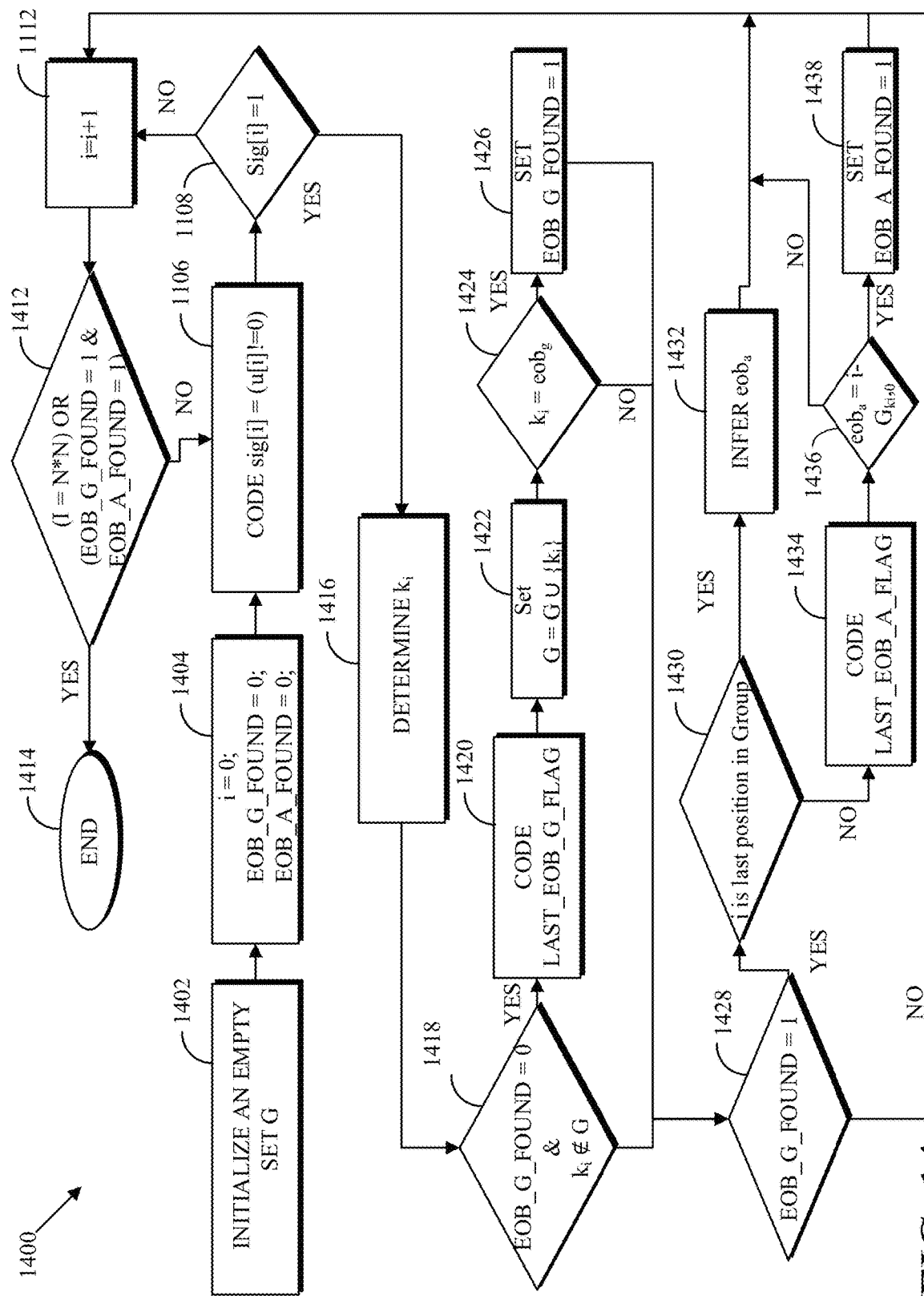
FIG. 14 is a flowchart diagram of a process for coding, using a coefficient groups coordinate system, the location of the last non-zero coefficient of a transform block of coefficients according to an implementation of this disclosure.

FIG. 14 is a flowchart diagram of a process 1400 for coding, using a coefficient groups coordinate system, the location of the last non-zero coefficient of a transform block of coefficients according to an implementation of this disclosure. The coefficient groups coordinate system partitions the transform block into groups of transform coefficients. A first dimension of the coefficient groups coordinate system can be the groups of quantized transform coefficients and a second dimension can be a location within a group. The coefficient groups coordinate system can partition all scan positions {0, . . . , N*N−1} into a number of non-overlapping groups {$G_0, \ldots, G_K$}, where K is a positive integer that is less than N*N−1. In the following description, stating that a group includes a coefficient is equivalent to stating that the group includes the scan index of the coefficient. Similarly, the group number of a non-zero coefficient is equivalent to the group number that includes the scan index of the non-zero coefficient.

Given coefficient groups {$G_0, \ldots, G_K$}, the position eob of the last non-zero coefficient in a transform block can be described using ($eob_g, eob_a$) where $eob_g$ indicates the index k of the group $G_k$ that includes the end-of-block coefficient, and $eob_a$ indicates an offset position in the group $G_k$. The offset position $eob_a$ can be determined as $eob_a = eob - G_{k,0}$. That is, the offset position $eob_a$ is the scan index position of the end-of-block coefficient minus the first scan index of the group that includes the end-of-block coefficient.

FIG. 16 is an example of a coefficient groups coordinate system 1600 according to implementations of this disclosure. The coefficient groups coordinate system 1600 partitions the scan positions into groups $G_k$ such that each group includes the scan positions {16k, 16k+1, . . . , 16k+15}. That is, each group $G_k$ consists of 16 consecutive scan positions. As such, the coefficient groups coordinate system 1600 includes four (4) groups. The group $G_1$ (i.e., group 1602) includes the scan positions {0, 1, . . . , 15}. The group $G_2$ (i.e., group 1604) includes the scan positions {16, 17, . . . , 31}. The group $G_3$ (i.e., group 1606) includes the scan positions {31, 32, . . . , 47}. The group $G_4$ (i.e., group 1608) includes the scan positions {48, 49, . . . , 63}.

Other coefficient groups are also possible. For example, the scan positions can be partitioned into the groups $G_0$={0}, $G_1$={1}, $G_2$={2, 3}, $G_3$={4, 5, 6, 7}, $G_4$={8, . . . , 15}, $G_5$={16, . . . , 31}, $G_6$={32, . . . , 63}, $G_7$={64, . . . , 127}, $G_8$={128, . . . , 255}, $G_9$={256, . . . , 511}, $G_{10}$={512, . . . , 1023}. Yet another example of coefficient groups $G_k$ can be $G_0$={0}, $G_1$={1}, $G_2$={2, 3}, $G_3$={4, 5, 6, 7}, $G_4$={8, . . . , 15}, $G_5$={16, . . . , 31}, $G_k$={32+16(k−6), . . . , 47+16(k−6)} for k≥6.

The process 1400 is an example of coding the coefficient group and position offset of the end-of-block, ($eob_g, eob_a$). The process 1400 can share aspects of the process 1100. Descriptions are omitted for blocks of the process 1400 that are numbered as the blocks of the process 1100.

At 1402, the process 1400 initializes a group set G to an empty set. The group set G keeps track of the groups already visited by the process 1400. A visited group, in this context, means that when a current non-zero coefficient is visited given the scan order, another non-zero coefficient is already determined to be included in the same group as the current non-zero coefficient.

At 1404, a scan position i is initialized to zero, a flag EOB_G_FOUND is set to false (e.g., the value zero); and a flag EOB_A_FOUND is set to false. The scan position i is used as an index into the one-dimensional array u. The flag EOB_G_FOUND indicates whether the scan position of a transform coefficient that falls within the same group as the scan position of the end-of-block coefficient has been processed (i.e., visited according to the scan order). The flag EOB_A_FOUND indicates whether the position offset of a current transform coefficient within the group that includes the last non-zero coefficient is the position offset of the last non-zero coefficient.

At 1416, the process 1400 determines the group number to which the current coefficient belongs. Equivalently, the process 1400 determines the current group number of the group to which the scan position of the current coefficient belongs. The process 1400 can determine current group number $k_i$ of the scan position i (i.e., the scan position i) such that the scan position i is in the group $G_{k_i}$.

At 1418, if the process 1400 determines that the group including the last non-zero coefficient has not been determined (i.e., the flag EOB_G_FOUND=0) and the current group number $k_i$ has not been visited (i.e., the value $k_i$ is not in the set G), then the process 1400 proceeds to 1420; otherwise the process 1400 proceeds to 1428.

At 1420, the process 1400 codes a flag LAST_EOB_G_FLAG. The flag LAST_EOB_G_FLAG indicates whether the current group number $k_i$ is the group number of the last non-zero coefficient. For example, when implemented by an encoder, the process 1400 can encode the value $k_i = eob_g$. When implemented by a decoder, the process 1400 can decode a syntax element from which the flag LAST_EOB_G_FLAG can be set. A zero (0) can be coded when the current group number is not the same as the group number of the last non-zero coefficient; otherwise, a one (1) is coded.

At 1422, the current group number $k_i$ is added to the group set G to indicate that the group number $k_i$ has been visited so that when/if another non-zero transform within the same group is visited, the process 1400 can skip the sequence 1420-1426 and, consequently, skip coding (at 1420) another value indicating whether the group number $k_i$ includes the last non-zero transform coefficient of the block.

At 1424, if the current group number $k_i$ is equal to the group number of the last non-zero coefficient (i.e., when $k_i = eob_g$ or, equivalently, when LAST_EOB_G_FLAG=1), then the process 1400 sets (at 1426) the flag EOB_G_FOUND to true (e.g., EOB_G_FOUND=1); otherwise, the process 1400 proceeds to 1428. When implemented by a decoder, the process 1400, at 1426, can also record that the group numbered $k_i$ is the group that includes the last non-zero coefficient (i.e., $eob_g$). The process 1400 then proceeds to 1428.

At 1428, if the process 1400 determines that EOB_G_FOUND is set (i.e., EOB_G_FOUND=1), then the process 1400 proceeds to 1430; otherwise the process 1400 proceeds to 1112. In the sequence 1430-1438, the process 1400 codes or infers whether the position offset of a non-zero coefficient in the group that includes the last non-zero coefficient is the position of the last non-zero coefficient. At 1428, if the flag EOB_G_FOUND is set, it means also that the current group numbered $k_i$ is the group that includes the scan index of the last non-zero coefficient (i.e., $eob_g$).

At 1430, if the scan position i is the last position in the group, then the process 1400 proceeds to 1432; otherwise, the process 1400 proceeds to 1434. In an example, the process 1400 can determine whether the scan position i is the last position in the group by testing whether the next scan position value (i.e., i+1) is outside the group. Referring to FIG. 16 for an illustration, to determine whether the scan index 15 is the last position of group $G_1$ (i.e., the group 1602), the process 1400 tests whether the scan index i+1=16 is in the group $G_1$. As indicated above, the group $G_2$ (i.e., the group 1604) is the group that contains the scan position 16. As such, (i+1) is not in G1 and, therefore, scan position i is the last position in the group $G_1$.

At 1432, the process 1400 can infer (instead of encoding by an encoder or decoding by a decoder) that the position offset of the last non-zero coefficient (i.e., $eob_a$) is the same as the offset of the last non-zero coefficient. That is, it can be inferred that $eob_a$ is equal to $i - G_{k_i,0}$. That is, the offset position of the last non-zero coefficient is equal to the current scan index (i) minus the first scan index of the group that includes the scan index i. For example, and using the groups of FIG. 16, given a current scan position i=39, the first scan position of the group that includes the scan position i is 32. This is so because the group that includes the scan position 39 is the group 1604 and the first scan position of the group 1604 is the scan position 32.

At 1434, the process 1400 codes a flag LAST_EOB_A_FLAG. The flag LAST_EOB_A_FLAG indicates whether the position offset of the current non-zero coefficient within the group is the position offset of the last non-zero coefficient. For example, when implemented by an encoder, the process 1400 can encode the value (i−G=$eob_a$). When implemented in a decoder, the process 1400 can decode a syntax element from which the flag LAST_EOB_A_FLAG can be set. A zero (0) can be coded when the position offset within the group of the current coefficient is not the same as the position offset of the last non-zero coefficient; otherwise, a one (1) is coded.

At 1436, the process 1400 determines whether (i−$G_{k_{i,0}}$=$eob_a$) or, equivalently, when LAST_EOB_A_FLAG=1. If not, the process 1400 proceeds to 1112. If so, the process 1400 sets (at 1438) the flag EOB_A_FOUND to true (e.g., EOB_A_FOUND=1). When implemented by a decoder, the process 1400, at 1438, can also record that the value i−$G_{k_{i,0}}$ is the position offset ($eob_a$) of the last non-zero coefficient. The process 1400 then proceeds to 1112.

At 1412, if all the coefficients of the transform block have been processed (i.e., the scan position i=N*N) or, if the group of the last non-zero transform coefficient has been visited (i.e., EOB_G_FOUND=1) and the position offset of the last non-zero position within the group has been found (i.e., EOB_A_FOUND=1), then the process 1400 terminates at 1114; otherwise the process continues at 1106.

In an implementation, the process 1400 can, at 1106, infer (instead of encoding by an encoder or decoding by a decoder) that the current coefficient is a non-zero coefficient when EOB_G_FOUND=1 (i.e., the current group is the group that includes the last non-zero coefficient) and the current scan position i is the last offset position of the group (i.e., i is the last position of $G_{k_j}$). As such, the process 1400 can save the cost of encoding or decoding the value sig[i].

Figure 17:
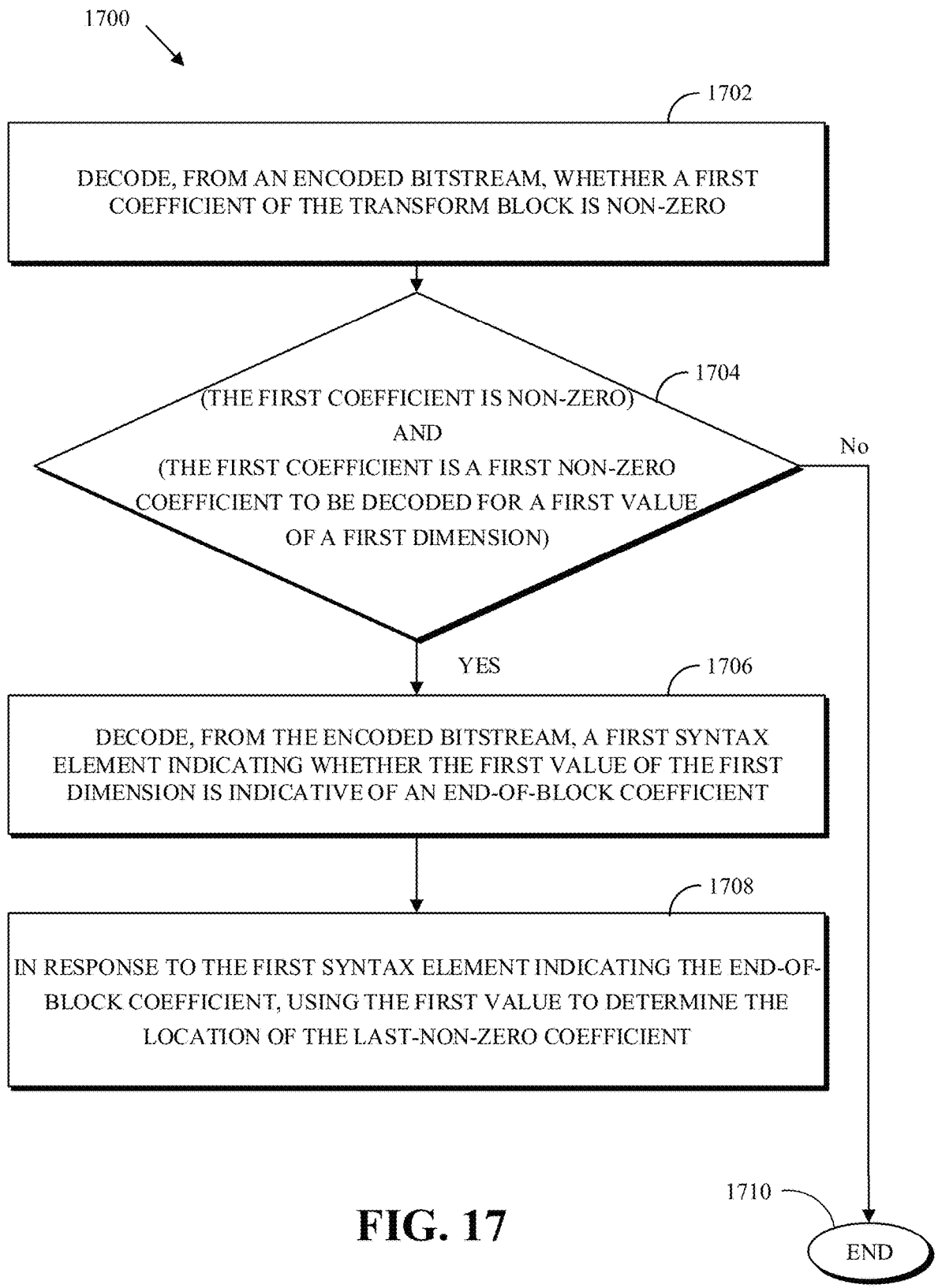
FIG. 17 is a flowchart diagram of a process for decoding a location of a last-non-zero coefficient of a transform block according to an implementation of this disclosure.

FIG. 17 is a flowchart diagram of a process 1700 for decoding a location of a last-non-zero coefficient of a transform block according to an implementation of this disclosure. The process 1700 can be implemented in a decoder such as the decoder 500. The process 1700 can be implemented by a receiving station. The process 1700 can be implemented, for example, as a software program that can be executed by computing devices. The software program can include machine-readable instructions that can be stored in a memory such as the memory 204 or the secondary storage 214, and that can be executed by a processor, such as CPU 202, to cause the computing device to perform the process 1700. The process 1700 can be implemented using specialized hardware or firmware. Some computing devices can have multiple memories, multiple processors, or both. The steps or operations of the process 1700 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 1702, the process 1700 decodes, from an encoded bitstream, such as the compressed bitstream 420 of FIG. 5, whether a first coefficient of the transform block is non-zero. In an example, the block 1702 can be as described with respect to the block 1108 of FIGS. 11-14.

At 1704, the process 1700 determines if the first coefficient is non-zero and if the first coefficient is a first non-zero coefficient to be decoded for a first value of a first dimension. If so, the process 1700 proceeds to 1706; otherwise the process ends at 1710.

In an example, the first value of the first dimension can be a column value for a column dimension of the Cartesian coordinate system as described with respect to FIG. 11 and the determining can be as described with respect to the block 1118. In an example, the first value of the first dimension can be a row value for a row dimension of the Cartesian coordinate system as described with respect to FIG. 11 and the determining can be as described with respect to the block 1128. In an example, the first value of the first dimension can be a column group value for a column group dimension of the Cartesian grouping coordinate system as described with respect to FIG. 12 and the determining can be as described with respect to the block 1218. In an example, the first value of the first dimension can be a row group value for a row group dimension of the Cartesian grouping coordinate system as described with respect to FIG. 12 and the determining can be as described with respect to the block 1228. In an example, the first value of the first dimension can be an anti-diagonal line value for an anti-diagonal dimension of the polar coordinate system as described with respect to FIG. 13 and the determining can be as described with respect to the block 1318. In an example, the first value of the first dimension can be a coefficient group value for a coefficient group dimension of the coefficient groups coordinate system as described with respect to FIG. 14 and the determining can be as described with respect to the block 1418.

At 1706, the process 1700 decodes, from the encoded bitstream, a first syntax element indicating whether the first value of the first dimension is indicative of an end-of-block coefficient. The decoding can depend on the coordinate system used. In an example, the decoding can be as described with respect to 1120 or 1130 of FIG. 11. In an example, the decoding can be as described with respect to 1220 or 1230 of FIG. 12. In an example, the decoding can be as described with respect to 1320 of FIG. 13. In an example, the decoding can be as described with respect to 1420 of FIG. 14.

At 1707, in response to the first syntax element indicating the end-of-block coefficient, the process 1700 uses the first value to determine the location of the last-non-zero coefficient. In an example, the block 1707 can be as described with respect to the sequence 1124-1126 of FIG. 11. In an example, the block 1707 can be as described with respect to the sequence 1134-1136 of FIG. 11. In an example, the block 1707 can be as described with respect to the sequence 1224-1127 of FIG. 12. In an example, the block 1707 can be as described with respect to the sequence 1234-1237 of FIG. 12. In an example, the block 1707 can be as described with respect to the sequence 1324-1326 of FIG. 13. In an example, the block 1707 can be as described with respect to the sequence 1424-1426 of FIG. 14.

In an implementation, the process 1700 can include, in response to determining that the first transform coefficient is a first non-zero coefficient to be decoded for a second value of a second dimension, decoding, from the encoded bitstream, a second syntax element indicating whether the second value of the second dimension is indicative of an end-of-block coefficient and, in response to the second syntax element indicating the end-of-block coefficient, using the second value to determine the location of the last-non-zero coefficient.

In an implementation of the process 1700, the first dimension and the second dimension are dimensions in a coordinate system comprising columns and rows of the transform block. The coordinate system can be as described with respect to the Cartesian coordinate system of FIG. 11.

In an implementation, the first dimension and the second dimension can be dimensions in a polar coordinate system. The polar coordinate system can be as described with respect to FIG. 7. The polar coordinate system can be centered at a DC coefficient of the transform block, the first dimension can correspond to anti-diagonal lines of a scan order used for encoding the transform block, and the second dimension can correspond to a position on an anti-diagonal line of the first dimension.

In an implementation of the process 1700, the first dimension and the second dimension can be dimensions in a coefficient groups coordinate system. The coefficient groups coordinate system can be as described with respect to FIG. 14. In an example, the coefficient groups coordinate system can partition the scan positions of a scan order into groups of scan positions, the first dimension can correspond to the groups of scan positions and the second dimension can correspond to an offset position of a scan index within a group. In an example, the coefficient groups coordinate system can partition the transform block into groups of transform coefficients, the first dimension can correspond to the groups of transform coefficients and the second dimension can correspond to a location within a group.

In an implementation of a coefficient groups coordinate system, the groups can include an equal number of scan positions. For example, the equal number of scan positions can be 16.

In an implementation of the process 1700, the first dimension and the second dimension are dimensions in a Cartesian grouping coordinate system. The Cartesian grouping coordinate system can be as described with respect to FIG. 12. The first dimension can correspond to groups of columns of the transform block and the second dimension can correspond to groups of rows of the transform block.

The transform block of coefficients can be a transform block of a residual block predicted using an intra-prediction. The transform coefficients can be transform coefficients for a block of luminance color components.

Figure 18:
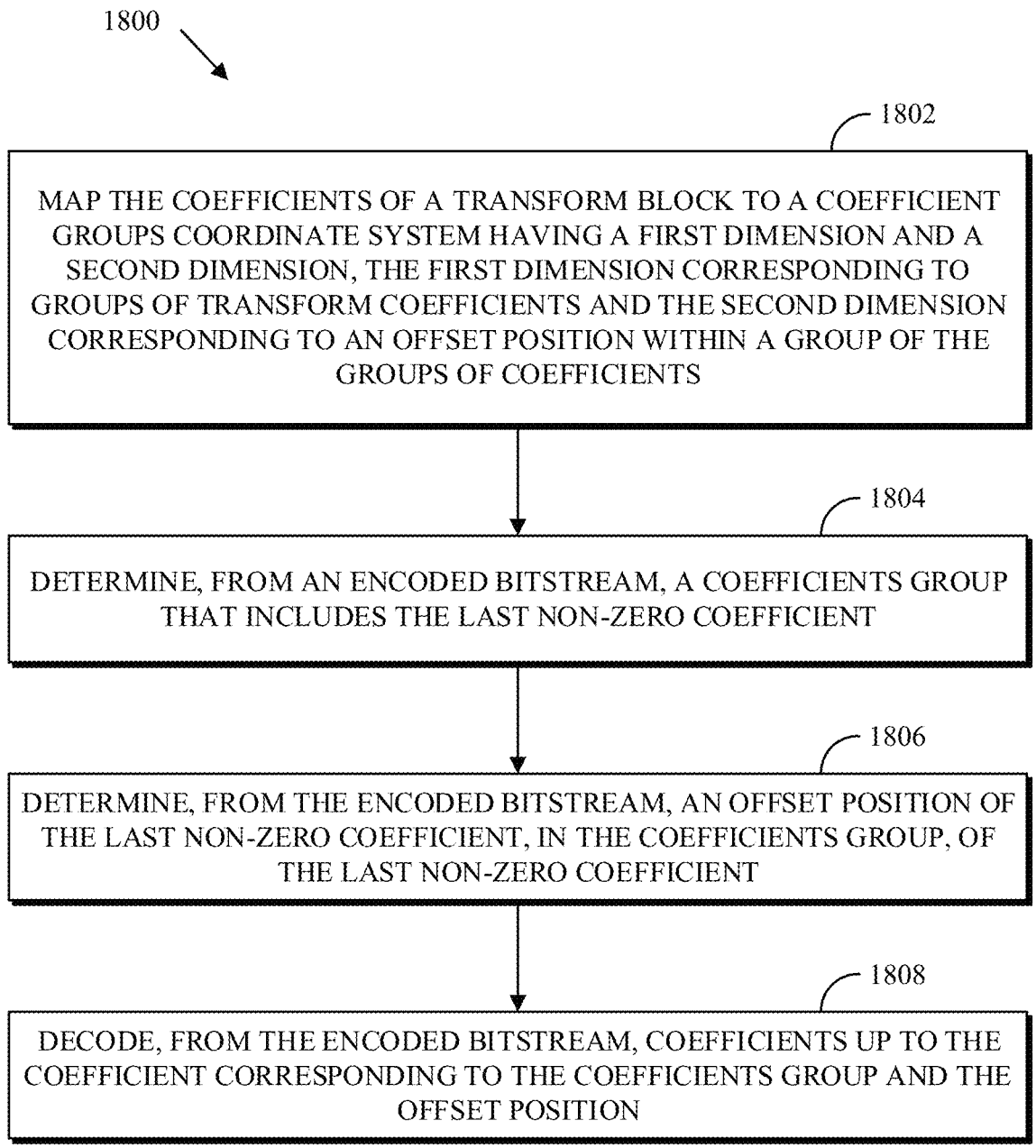
FIG. 18 is a flowchart diagram of another process for decoding a location of a last-non-zero coefficient of a transform block according to an implementation of this disclosure.

FIG. 18 is a flowchart diagram of another process 1800 for decoding a location of a last-non-zero coefficient of a transform block according to an implementation of this disclosure. The process 1800 can be implemented in a decoder such as the encoder 500 of FIG. 5. The process 1800 can be implemented, for example, as a software program that can be executed by computing devices such as receiving station 106. The software program can include machine-readable instructions that can be stored in a memory such as the memory 204 or the secondary storage 214, and that can be executed by a processor, such as CPU 202, to cause the computing device to perform the process 1800. In at least some implementations, the process 1100 can be performed in whole or in part by the entropy decoding stage 502 of the decoder 500 of FIG. 5.

At 1802, the process 1800 maps the coefficients of the transform block to a coefficient groups coordinate system. The coefficient groups coordinate system can have a first dimension and a second dimension. The first dimension can correspond to groups of transform coefficients. The second dimension can correspond to an offset position within a group of the groups of coefficients. In an example, some of the groups can include non-equal number of coefficients.

At 1804, the process 1800 determines, from an encoded bitstream, a coefficients group that includes the last non-zero coefficient. For example, and as described with respect to FIGS. 14 and 16, the process can determine the coefficients group that includes the last non-zero coefficient by decoding a syntax element or a flag indicatives of the group 1606 as described with respect to 1420.

At 1806, the process 1800 determines, from the encoded bitstream, an offset position of the last non-zero coefficient, in the coefficients group, of the last non-zero coefficient. For example, the process can determine the offset position as described with respect to FIG. 14.

At 1808, the process 1800 decodes, from the encoded bitstream, coefficients up to the coefficient corresponding to the coefficients group and the offset position. In an example, the coefficients can be decoded as described with respect to 1412 and 1106 of FIG. 14.

In an implementation of the process 1800, determining the offset position can include decoding, from the encoded bitstream, a syntax element indicative of the offset position as described, for example, with respect to 1434 of FIG. 14.

In an implementation of the process 1800, determining the offset position can include, in response to determining that a current coefficient being decoded is at a last offset position in the coefficients group, inferring that the offset position of the last non-zero coefficient is the last offset position. In an example, the offset position can be inferred as described with respect to 1430 and 1432 of FIG. 14.

In an implementation of the process 1800, decoding coefficients up to the coefficient corresponding to the coefficients group and the offset position can include, in response to determining that a current coefficient being decoded is at a last offset position in the coefficients group, inferring that the current coefficient is a non-zero coefficient. The process can infer that the current coefficient is a non-zero coefficient as described with respect to 1106 of FIG. 14.

Yet another process for decoding a location of a last non-zero coefficient of a transform block of coefficients according to an implementation is now disclosed. The process includes mapping the coefficients of the transform block to a coordinate system having a first dimension and a second dimension. The first one or more of the coefficients are arranged on the coordinate system at a first value of the first dimension and a second one or more of the coefficients are arranged on the coordinate system at a second value of the second dimension. The process also includes decoding, from an encoded bitstream, only once for the first value whether the first value of the first dimension includes the last non-zero coefficient, and decoding, from an encoded bitstream, only once for the second value whether the second value of the second dimension includes the last non-zero coefficient, and determining the location of the last non-zero coefficient using a decoded third value of the first dimension and a decoded fourth value of the second dimension. The decoded third value and the decoded fourth value can indicate the last non-zero coefficient.

For example, in the case of a polar coordinate system, the first dimension can be the anti-diagonal line and a second dimension can be a position on the diagonal line. According, an example of decoding only once for the first value whether the first value of the first dimension includes the last non-zero coefficient can be decoding only once whether the anti-diagonal line 1502 of FIG. 15 (i.e., corresponding to row+col=0+1=1+0=1) includes the last non-zero coefficient. In this case, the anti-diagonal line 1502 (i.e., the first value) of the anti-diagonal line dimension (i.e., the first dimension) does not include the last non-zero coefficient.

In an implementation, decoding the fourth value can mean inferring the fourth value. For example, in the case of a Cartesian coordinate system, the fourth value can be inferred as described with respect to 1120 of FIG. 11. For example, in the case of a polar coordinate system, the fourth value can be inferred as described with respect to 1332 of FIG. 13. For example, in a case a coefficient groups coordinate system, the fourth value can be inferred as described above with respect to 1432 of FIG. 14. For example, in a case where the first dimension includes only one element, then the fourth value can be inferred to be the one value. If for example, a group in a groups coordinate system includes only one scan position (e.g., $G_0=\{0\}$, $G_1=\{1\}$), then the fourth value can be inferred to be the one scan position of the group. If, for example, in a polar coordinate system, the determined anti-diagonal line is the anti-diagonal line that includes the DC coefficient (i.e., the anti-diagonal line corresponding to row+col=0+0=0), then the fourth value can be inferred.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a transform block of coefficients, wherein the transform block is decoded using a scan order, the apparatus comprising:
 a memory; and
 a processor, the processor configured to execute instructions stored in the memory to:
  partition all scan positions of the scan order into K>1 non-overlapping groups,
   each of the non-overlapping groups consists of consecutive scan positions of the scan order,
   the non-overlapping groups constitute a coefficient groups coordinate system having a first dimension and a second dimension, wherein a first value of the first dimension corresponds to a group of the non-overlapping groups and a second value of the second dimension corresponds to an offset position within the group of the non-overlapping groups;
  determine, from an encoded bitstream, a group value corresponding to the first value of the first dimension, wherein the group value indicates one of the non-overlapping groups, and wherein the one of the non-overlapping groups includes a last non-zero coefficient of the transform block;

determine, from the encoded bitstream, an offset position corresponding to the second value of the second dimension, the offset position indicating a position within the one of the non-overlapping groups of the last non-zero coefficient; and decode, from the encoded bitstream, coefficients using the one of the non-overlapping groups and the offset position.

2. The apparatus of claim 1, wherein to determine the offset position comprises to:
   decode, from the encoded bitstream, a syntax element indicative of the offset position.

3. The apparatus of claim 1, wherein to determine the offset position comprises to:
   in response to determining that a current coefficient being decoded is at a last offset position in the one of the non-overlapping groups, infer that the offset position of the last non-zero coefficient is the last offset position.

4. The apparatus of claim 3, wherein a first group of the non-overlapping groups and a second group of the non-overlapping groups include non-equal numbers of scan positions.

5. The apparatus of claim 1, wherein to determine the offset position comprises to:
   infer that the offset position of the last non-zero coefficient is a scan position of the last non-zero coefficient.

6. A method for decoding a location of a last non-zero coefficient of a transform block of coefficients, wherein the transform block is decoded using a scan order, comprising:
   partitioning all scan positions of the scan order into non-overlapping groups, each of the non-overlapping groups consisting of consecutive scan positions of the scan order, wherein the scan order is a one-dimensional structure that specifies an order of traversal of the coefficients of the transform block, and wherein each position of the one-dimensional structure of the scan order maps to a two-dimensional location of the transform block;
   determining, from an encoded bitstream, a group of the non-overlapping groups, wherein the group includes the last non-zero coefficient of the transform block;
   determining, from the encoded bitstream, an offset position, wherein the offset position indicates a position within the group of the last non-zero coefficient; and
   decoding, from the encoded bitstream, the coefficients using the one of the non-overlapping groups and the offset position.

7. The method of claim 6, wherein determining the offset position comprising:
   decoding, from the encoded bitstream, a syntax element indicative of the offset position.

8. The method of claim 6, wherein determining the offset position comprising:
   in response to determining that a current coefficient being decoded is at a last offset position within the one of the non-overlapping groups, inferring that the current coefficient is the last non-zero coefficient.

9. The method of claim 8, wherein a first group of the non-overlapping groups and a second group of the non-overlapping groups include non-equal numbers of scan positions.

10. The method of claim 6, wherein the non-overlapping groups comprises three groups.

11. An apparatus for coding a transform block of coefficients, wherein the transform block is decoded using a scan order, the apparatus comprising:

a memory; and
a processor, the processor configured to execute instructions stored in the memory to:
   determine a first index indicating a group of consecutive scan positions in the scan order, wherein the group of consecutive scan positions includes a scan position of a last non-zero coefficient, and wherein the scan order is a one-dimensional structure that specifies an order of traversal of the coefficients of the transform block, and wherein each position of the one-dimensional structure of the scan order maps to a two-dimensional location of the transform block;
   determine a second index indicating an offset within the group of consecutive scan positions of the last non-zero coefficient; and
   code a subset of the coefficients until the second index is determined.

12. The apparatus of claim 11,
   wherein the group comprises a first scan position and a last scan position, and
   wherein to determine the second index comprises to:
      determine the second index as a difference between a scan position of the last non-zero coefficient and the first scan position.

13. The apparatus of claim 12, wherein to determine the second index comprises to:
   on a condition that the scan position of the last non-zero coefficient is equal to the last scan position, infer that the second index is the last scan position.

14. The apparatus of claim 11, wherein the scan order comprises scan positions, and wherein the scan positions being partitioned into non-overlapping scan groups, wherein the non-overlapping scan groups include the group of consecutive scan positions.

15. The apparatus of claim 14, wherein the instructions further comprise instructions to:
   decode, only once for each group of the non-overlapping scan groups, a respective flag indicating whether the each group includes the scan position of the last non-zero coefficient.

16. The apparatus of claim 15, wherein the instructions further comprise instructions to:
   decode, after decoding a flag indicating that the group contains the last non-zero coefficient, a second flag indicating the second index.

17. The apparatus of claim 14,
   wherein the non-overlapping scan groups comprise a first group, a second group, a third group, and a fourth group,
   wherein the first group consists of scan position 0,
   wherein the second group consists of scan position 1,
   wherein the third group consists of scan positions 2 and 3, and
   wherein the fourth group consists of the scan positions 4 to 7.

18. The apparatus of claim 17,
   wherein the non-overlapping scan groups comprise a fifth group,
   wherein the fifth group consists of scan positions 8 to 15.

19. The apparatus of claim 14, wherein each group of the non-overlapping scan groups consists of a same number of scan positions.

20. The apparatus of claim 11, wherein the apparatus is a decoder, and wherein to code the subset of the coefficients until the first index is determined and the second index is determined comprises to:
   sequentially decode, from a compressed bitstream, each coefficient of the subset of the coefficients until a first flag indicating that the first index is determined and until a second flag indicating that the second index is determined, wherein the first flag and the second flag are decoded from the compressed bitstream.

* * * * *